United States Patent
Fu et al.

(10) Patent No.: US 7,742,318 B2
(45) Date of Patent: Jun. 22, 2010

(54) MULTI-ELEMENT RESONANT CONVERTERS

(75) Inventors: Dianbo Fu, Blacksburg, VA (US); Fred C. Lee, Blacksburg, VA (US); Ya Liu, Blacksburg, VA (US); Ming Xu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 193 days.

(21) Appl. No.: 12/136,413

(22) Filed: Jun. 10, 2008

(65) Prior Publication Data

US 2009/0303753 A1     Dec. 10, 2009

(51) Int. Cl.
*H02M 3/335* (2006.01)
(52) U.S. Cl. ........................................ 363/16
(58) Field of Classification Search ............. 363/17, 363/16, 131
See application file for complete search history.

(56) References Cited

U.S. PATENT DOCUMENTS

| | | | | |
|---|---|---|---|---|
| 5,416,387 A | * | 5/1995 | Cuk et al. | 363/16 |
| 5,768,111 A | * | 6/1998 | Zaitsu | 363/15 |
| 6,535,407 B1 | * | 3/2003 | Zaitsu | 363/126 |

* cited by examiner

*Primary Examiner*—Shawn Riley
(74) *Attorney, Agent, or Firm*—Whitham, Curtis, Christofferson & Cook, P.C.

(57) ABSTRACT

A resonant switched power converter having switching frequency controlled in response to an output voltage thereof achieves over-current protection such as at start-up or under short circuit conditions using a resonant tank circuit which provides a notch filter in addition to a band pass filter. A additional band pass filter provided in the resonant tank circuit achieves increased power transfer to a load and reduced circulating resonant currents and conduction losses. The inductances of the preferred LCLCL tank circuit or other tank circuit with two pass band filters and a notch filter may be integrated into a single electrical component.

20 Claims, 28 Drawing Sheets fs=1.8MHz
Io=50%

MULTI-ELEMENT RESONANT CONVERTERS

BACKGROUND OF THE INVENTION

1. Field of the Invention

The present invention generally relates to power supply systems and voltage converters and, more particularly, to resonant DC/DC converters and power supplies having four or more resonating elements to achieve both increased efficiency and other desired characteristics such as start-up and short-circuit over-current protection.

2. Description of the Prior Art

Many currently available and foreseeable commercial electronic products provide for operation from DC power sources such as rechargeable batteries but also provide for obtaining power from commonly available AC distribution systems. Many such devices include digital logic circuitry which may be of a wide range of complexity and which may include technologically advanced components with stringent tolerances for voltage and current requirements including widely varying current demands at very low voltages such as are encountered in providing power to microprocessors. At the same time, there is a growing demand for both energy savings/high efficiency and simplicity and size reduction for economy of manufacture and convenience when placed in service.

To achieve high efficiency, switching converters have been employed as an alternative to analog voltage regulator circuits. To achieve high power density (e.g. the capability to deliver high power per unit volume) with switching converters, it has been found most effective to increase the switching frequency so that the size of passive components such as filter capacitor and inductor elements may be reduced since such element occupy a major portion of the volume of a switching converter of a given design and electrical specifications.

So-called hard-switching pulse width modulating (PWM) converters essentially regulate voltage for varying current load by altering the duty cycle of input of a generally higher voltage to a converter which may be of any of a number of known topologies functioning as a filter and can achieve efficiencies well above those of analog voltage regulator circuits which regulate voltage by developing a voltage drop across them, thus dissipating substantial power. However, the efficiency which can be achieved by hard-switching converters is limited by the switching losses which become especially severe as switching frequencies are increased.

So-called soft switching PWM converters such as a full bridge phase shift PWM converter or asymmetrical half bridge PWM converter are widely applied for front-end DC/DC conversion. Soft switching PWM converters which include a resonant circuit which is resonant near the switching frequency can achieve zero-voltage-switching (ZVS) since the resonant circuit reduces the voltage to zero or near-zero at the times switching must occur. Therefore, lower switching loss and higher frequency switching with improved efficiency can be accomplished compared with hard switching converters. However, the resonant circuit causes large currents to circulate within the converter, particularly at harmonics of the switching frequency, and conduction losses can be significant. Moreover, holdup time specifications require the converter to maintain output voltage more than 20 mS after AC input line drops. Therefore, bulky capacitors are used to provide energy during the holdup time. Thus the capacity of the holdup time capacitor is wholly determined by required energy during holdup time and severely limits the capability for increasing increased power density even though increasing the operating range can extract more power from the holdup capacitor and allow a capacitor of somewhat reduce value to be employed. Unfortunately, sacrifice of a significant degree of efficiency is required to extend the operating range in order to do so through known techniques. While some arrangements have been proposed for extending operational range and extending holdup time for a given capacitance, they are complex and difficult to control.

LLC resonant converters have also been proposed and have been extensively studied. While LLC converters can achieve zero voltage switching (ZVS) and zero current switching (ZCS) together with high voltage gain capability suitable for reducing the holdup capacitance requirement, currents during start up and short circuit conditions excessively stresses internal components, compromising reliability. Further, the magnitude of circulating resonant currents is aggravated; imposing an increased limitation of efficiency.

SUMMARY OF THE INVENTION

It is therefore an object of the present invention to provide a multi-element resonant DC/DC converter having inherent current limiting and reduced component stress during start up and short circuit conditions.

It is another object of the present invention to provide a resonant power converter capable of transferring power to a load at harmonics of the switching frequency in order to reduce conduction losses from circulating resonant currents.

It is a further object of the invention to provide for integration of all inductances for a five-element resonant tank circuit for achieving the meritorious effects of the invention into a single component.

In order to accomplish these and other objects of the invention, a multi-element DC/DC power converter is provided comprising a switched power input circuit and a resonant tank circuit comprising at least four elements, said resonant tank circuit providing a band pass filter resonant at a first frequency, a notch filter resonant at a second frequency higher than said first frequency. A further band pass filter resonant at a frequency which is a harmonic of the first frequency can increase power transfer to a load at harmonics of the switching frequency. All required inductive and transformer elements can also be integrated into a single electrical component.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
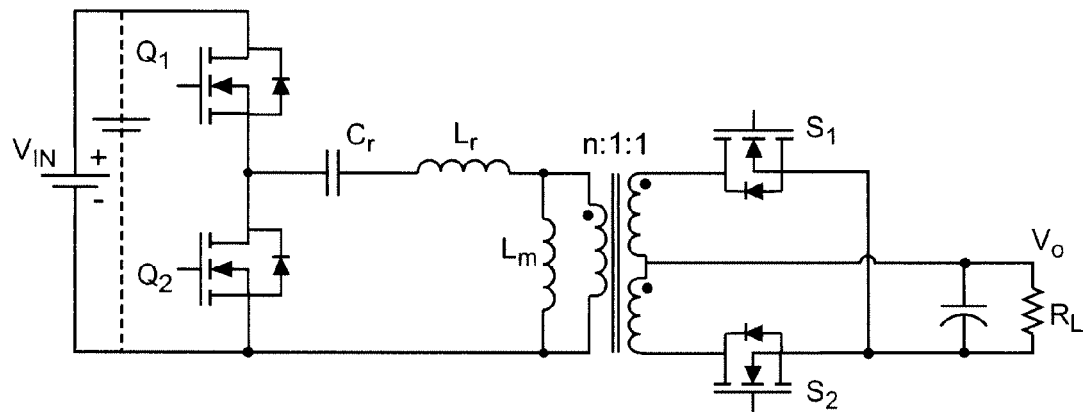
FIGS. 1 and 2 are a schematic diagram of an LLC resonant converter and a voltage gain curve thereof, respectively, provided for discussion of the problems addressed by the invention.

Referring now to the drawings, and more particularly to FIG. 1, a schematic diagram of an exemplary LLC resonant converter circuit, alluded to above, is shown. The general principles of operation of such an LLC resonant converter will be familiar to those skilled in the art. However, since this circuit is exemplary and arranged to facilitate discussion of the problems addressed by the present invention, no portion of FIG. 1 is admitted to be prior art as to the present invention. Essentially, switches $Q_1$ and $Q_2$ conduct alternately and provide a square wave input to capacitor $C_r$ forming a part of an LLC resonant tank circuit comprising $C_r$, $L_r$ and $L_m$ such that the square pulse input when $Q_1$ is conductive is converted to a half-sinusoid pulse that returns to approximately zero when, at a particular switching frequency, $Q_1$ is to be turned off and $Q_2$ turned on to achieve zero voltage switching (ZVS) and zero current switching (ZCS) as alluded to above. The sinusoidal waveform thus achieved will also allow ZVS and ZCS on the secondary side of the transformer.

Figure 2:
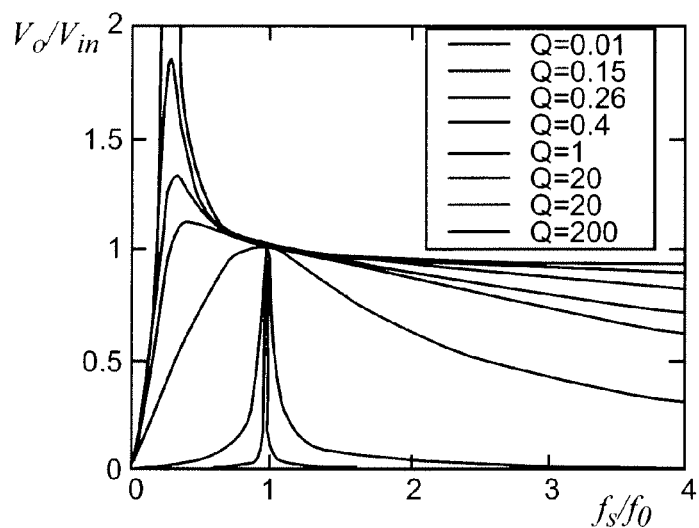

Referring now to FIG. 2, the other distinct advantage of an LLC resonant converter alluded to above can be readily appreciated from the voltage gain curve illustrated. The resonant parameters of the tank circuit are defined by:

$$f_0 = \frac{1}{2\pi} \frac{1}{\sqrt{L_r C_r}}$$

$$Z_0 = \sqrt{\frac{L_r}{C_r}}$$

$$Q = \frac{Z_0}{N^2 R_L}$$

Specifically, the horizontal axis is the switching frequency, $f_s$, at which the circuit is operated normalized to the resonant frequency, $f_o$, of the LLC resonant circuit. As can be seen, the voltage gain of the converter is unity at $f_s/f_o=1$ and rises sharply as $f_s$ is reduced below the resonant frequency. Therefore, by changing switching frequency, preferably in response to monitoring the output voltage of the converter and providing feedback to a voltage controlled oscillator arrangement or the like, regulation is provided and the operating range of the LLC resonant converter can be easily extended over a wide range and made highly suitable for hold-up capacitance reduction. That is, as the input voltage diminishes during the hold-up period and the voltage on a hold-up capacitance, shown in dashed lines in FIG. 1, is drawn down, the voltage gain can be increased to compensate for the reduced input voltage and allow the output voltage to remain substantially constant. Increase of voltage gain in such a manner also allows more energy to be extracted from the hold-up capacitor (e.g. at hold-up capacitor voltages below the converter output voltage).

However, as can also be readily appreciated from FIG. 2, at frequencies above $f_o$, the voltage gain is fairly flat although diminishing slightly with increase of $f_s$ due to increase of impedance of the tank circuit. However, with the tank circuit configured as a series (illustrated) or parallel connection of $C_r$, and $L_r$, impedance will increase only slowly with frequency since the capacitive impedance will diminish with frequency as the inductive impedance increases with frequency. That is, if $f_s$ is controlled in accordance with the desired output voltage to achieve regulation by control of voltage gain and thus adjust output voltage, when the output voltage is significantly below the desired/design voltage, as is the case at start-up and short-circuit or other overload conditions, the voltage gain of the converter is not significantly less than unity unless a very high switching frequency is applied. Since the nominal switching frequency of switched converters of any type is desirably in the MHZ range, a switching frequency sufficiently high to reduce voltage gain significantly below unity is not practical. Therefore, under start-up and short circuit conditions, output current will be very high; causing stress, damage or destruction of circuit elements in the circuit of FIG. 1. In summary, current limitation is not a practical possibility through use of switching frequency control alone in a soft switching LLC resonant converter.

Another approach to limiting start-up and short circuit condition current in the circuit of FIG. 1 would be to use pulse width modulation (PWM) control to limit the input voltage to the resonant tank circuit. However, such PWM control cannot be applied without losing the capability for ZVS under overload conditions which greatly increases switching losses (increasing heat dissipation requirements) and is, itself a source of electrical stress on circuit components. A further approach would be to include diode clamping circuits to clamp the voltage of the resonant capacitor and limit the energy stored in the resonant tank circuit. However, such an approach also limits the voltage gain that can be achieved at reduced switching frequency and thus is incompatible with use of control of voltage gain during hold-up to reduce the required hold-up capacitance required. The only other alternatives would be the addition of complex auxiliary circuits which would increase cost and increase power converter volume and which may be difficult to control or have other disadvantages.

Without adding such complex auxiliary circuits, a variant frequency control strategy in accordance with the present invention is to enhance the performance with shaping the characteristics of the resonant tank circuit. For example, the LLC resonant tank can be considered as a band pass filter. Note that the different voltage gain curves illustrated in FIG. 2 correspond to different quality factors or "Q" of the bandpass circuit and thus exhibit somewhat, and in some cases, significant differences in frequency selectivity. At the resonant frequency, the fundamental component can be delivered from the source to the load very efficiently. Therefore, high efficiency can be achieved. However, high efficiency consistent with current limitation can only be achieved with poor frequency selectivity, namely, very wide bandwidth. That is, the frequency has to be increased very high to achieve enough damping effect to limit current.

Figure 3:
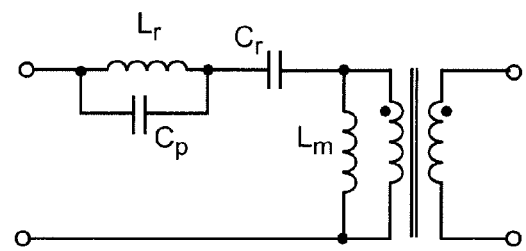
FIGS. 3 and 4 are a schematic diagram of an LLC resonant converter and a voltage gain curve thereof, respectively, of a multi-element resonant tank circuit having a band pass filter and a notch filter in accordance with the invention.
Figure 4:
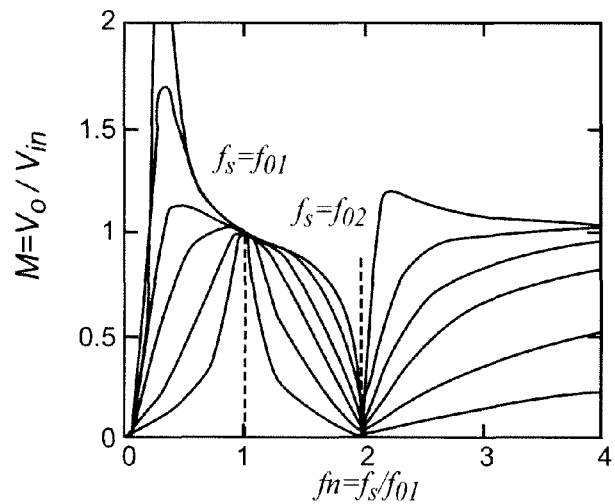
Figure 5A:
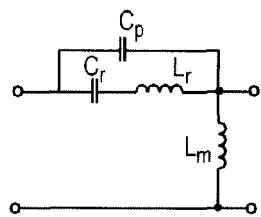
FIG. 5 illustrates other exemplary circuits, (a)-(f), including a band pass filter and a notch filter in accordance with the invention.
Figure 5B:
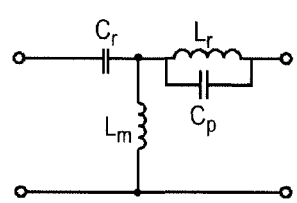
Figure 5C:
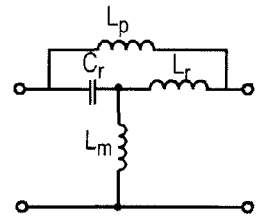
Figure 5D:
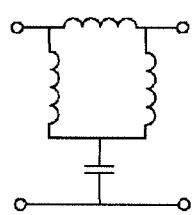
Figure 5E:
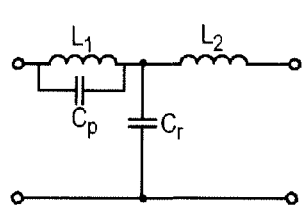
Figure 5F:
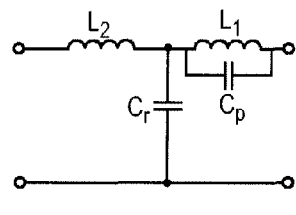

To improve the characteristics of LLC resonant converters, additional resonant element can be introduced in accordance with the invention, as will now be discussed. As shown in FIGS. 3 and 4, with an additional resonant element component, a multi-element resonant tank comprising four elements in a resonant circuit which combines a band pass filter and a notch filter can provide over-current protection in a very simple manner and without requiring impractically high frequency for switching. The notch filter section is created with $L_r$ and $C_p$. The band pass filter section comprises $L_r$, $C_r$ and $C_p$.

The voltage gain of this four-element resonant tank is illustrated in FIG. 4. The resonant frequencies are defined by $$f_{01} = \frac{1}{2\pi} \frac{1}{\sqrt{L_r(C_r + C_p)}}$$

$$f_{02} = \frac{1}{2\pi} \frac{1}{\sqrt{L_p C_p}}$$

It is clearly seen that the LCCL resonant tank with notch filter characteristic can create zero voltage gain. Conceptually, infinite impedance can be created when the circuit is operated at the resonant frequency $f_{02}$ of the notch filter. As a result, if overload such as at start-up or even a shorted output condition occurs, the current can be limited inherently by the resonant tank characteristic. That is, the notch filter center frequency $f_{02}$ can be designed to achieve the over load protection. The frequency $f_{02}$ is preferably designed to be close to nominal resonant frequency $f_{01}$ to improve frequency selectivity and reduce required switching bandwidth. Thus, the current can be limited without excessive increase of switching frequency with simple circuitry.

On the other hand, the resonant tank parameters should be designed very carefully. Otherwise, the notch filter section will affect the nominal operation adversely. For instance, if $f_{01}$ is designed very close to $f_{02}$, the notch filter section 'traps' energy. As a consequence, energy circulates in the notch filter section. Thus the choice of the notch filter resonant frequency relative to the band pass filter resonant frequency is important. In general, with variable frequency control, the resonant tank input voltage is excited as a square waveform. According to the Fourier analysis $$v_{in}(t) = \frac{4}{\pi} \cdot V_{in} \cdot \sum_{n=1,3...}^{\infty} \frac{\sin(n\omega_s t)}{n},$$

the voltage excitation only consists of odd harmonics. Therefore, to avoid circulating energy under nominal conditions, notch filter resonant frequency $f_{02}$ should be designed at an even multiple of the nominal band pass filter resonant frequency $f_{01}$. Meanwhile, it is preferred for f02 to be close to $f_{01}$. Thus, $f_{02}=2f_{01}$ is a good choice.

Figure 37A:
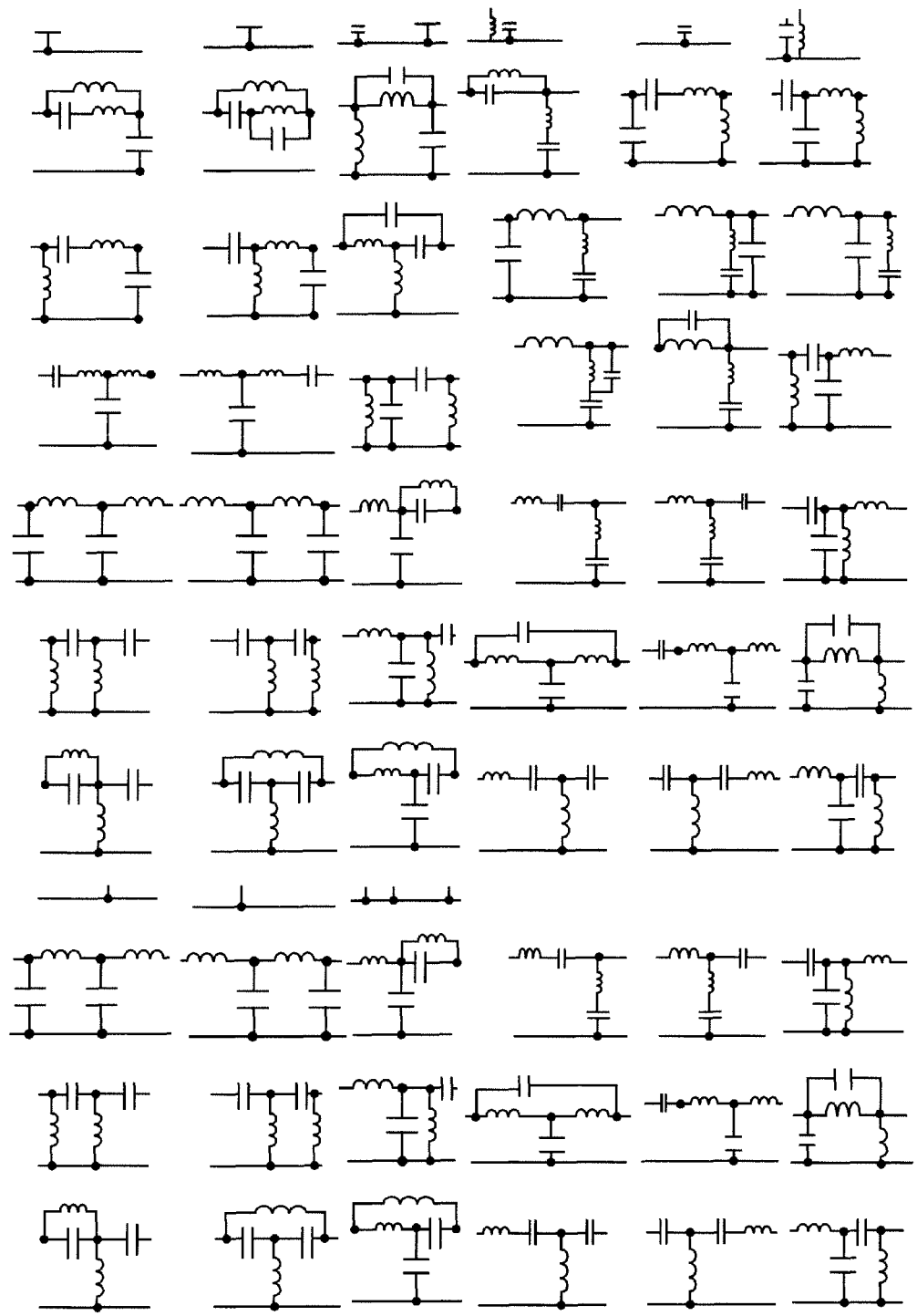
Figure 37B:
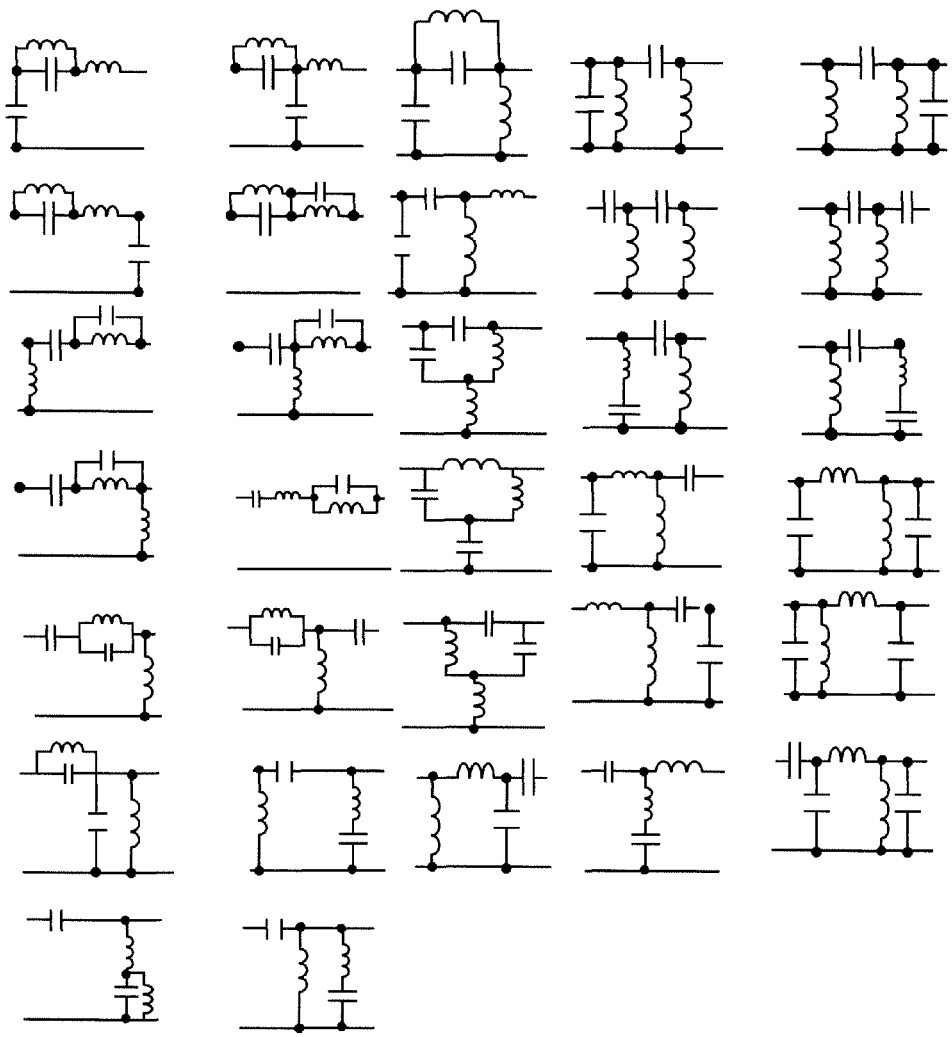
Figure 37C:
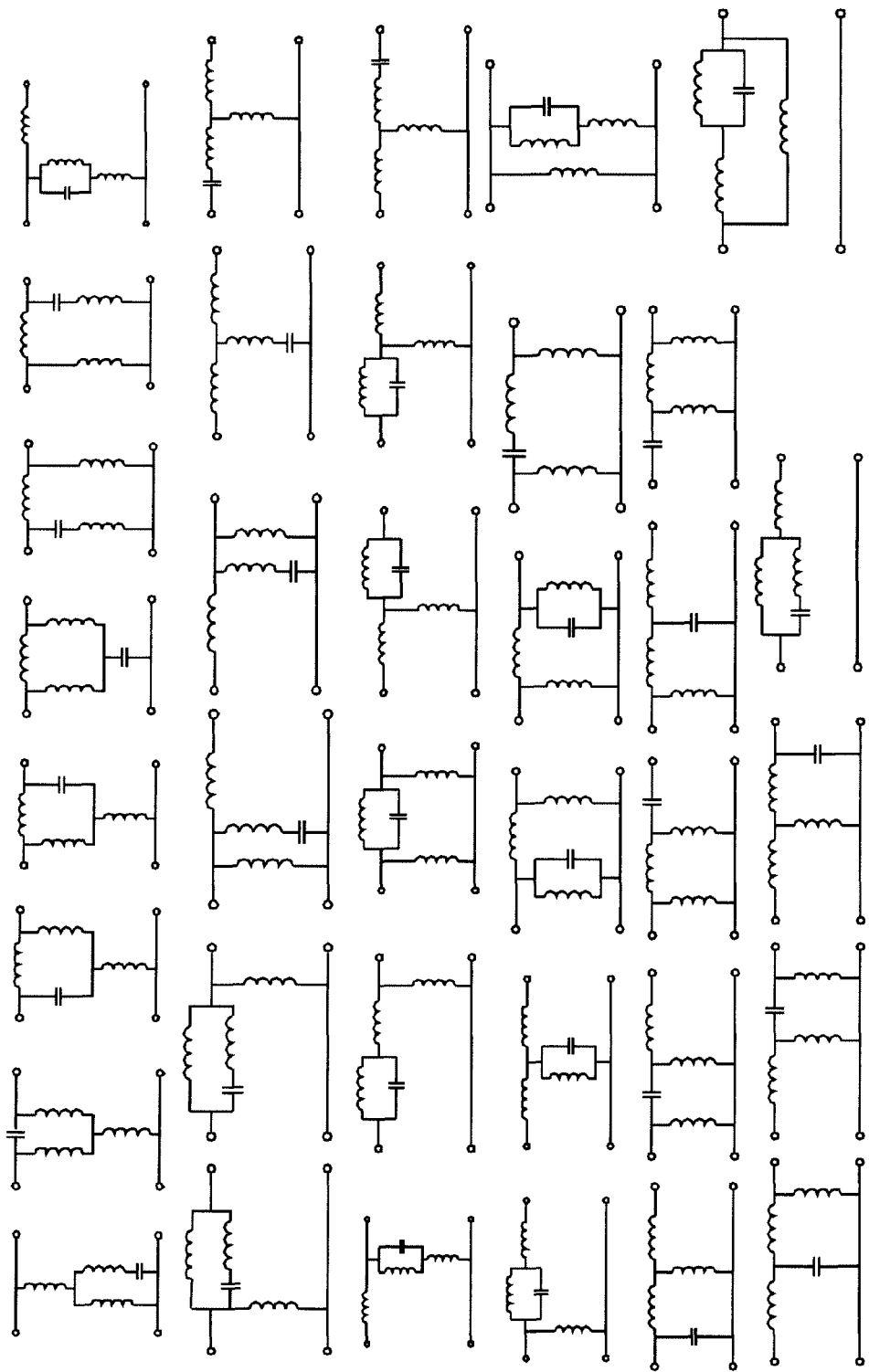
Figure 38A:
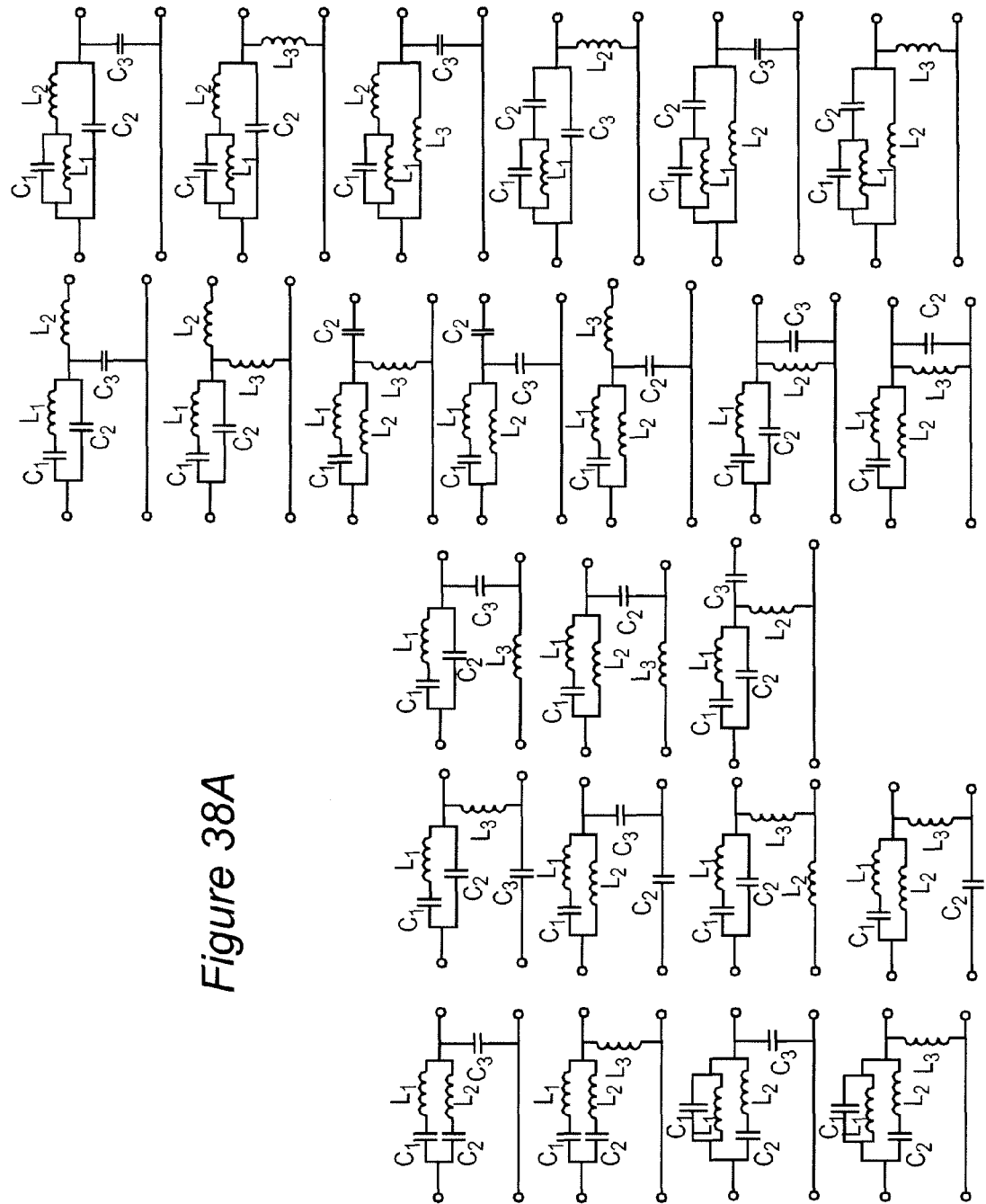
Figure 38B:
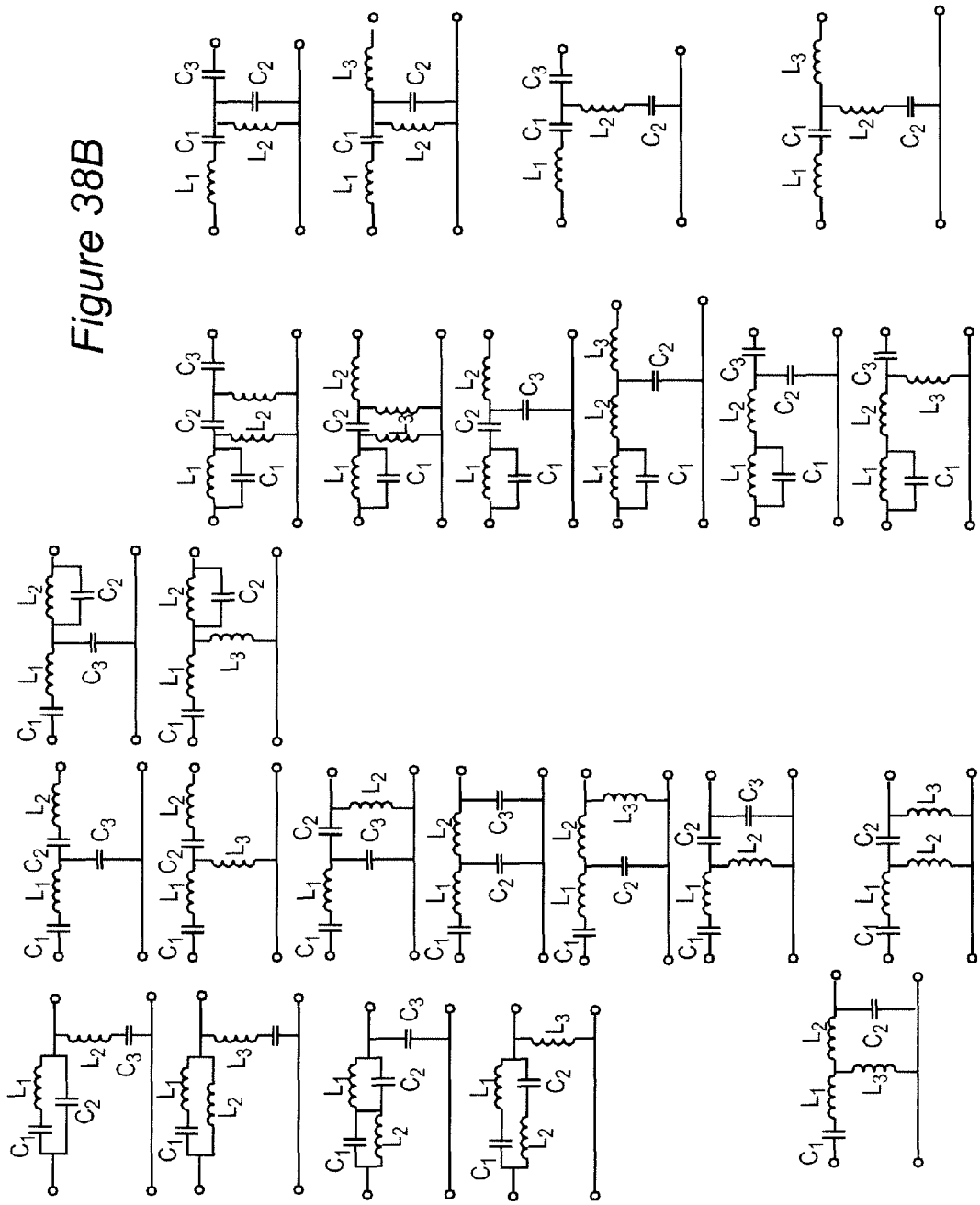
Figure 38C:
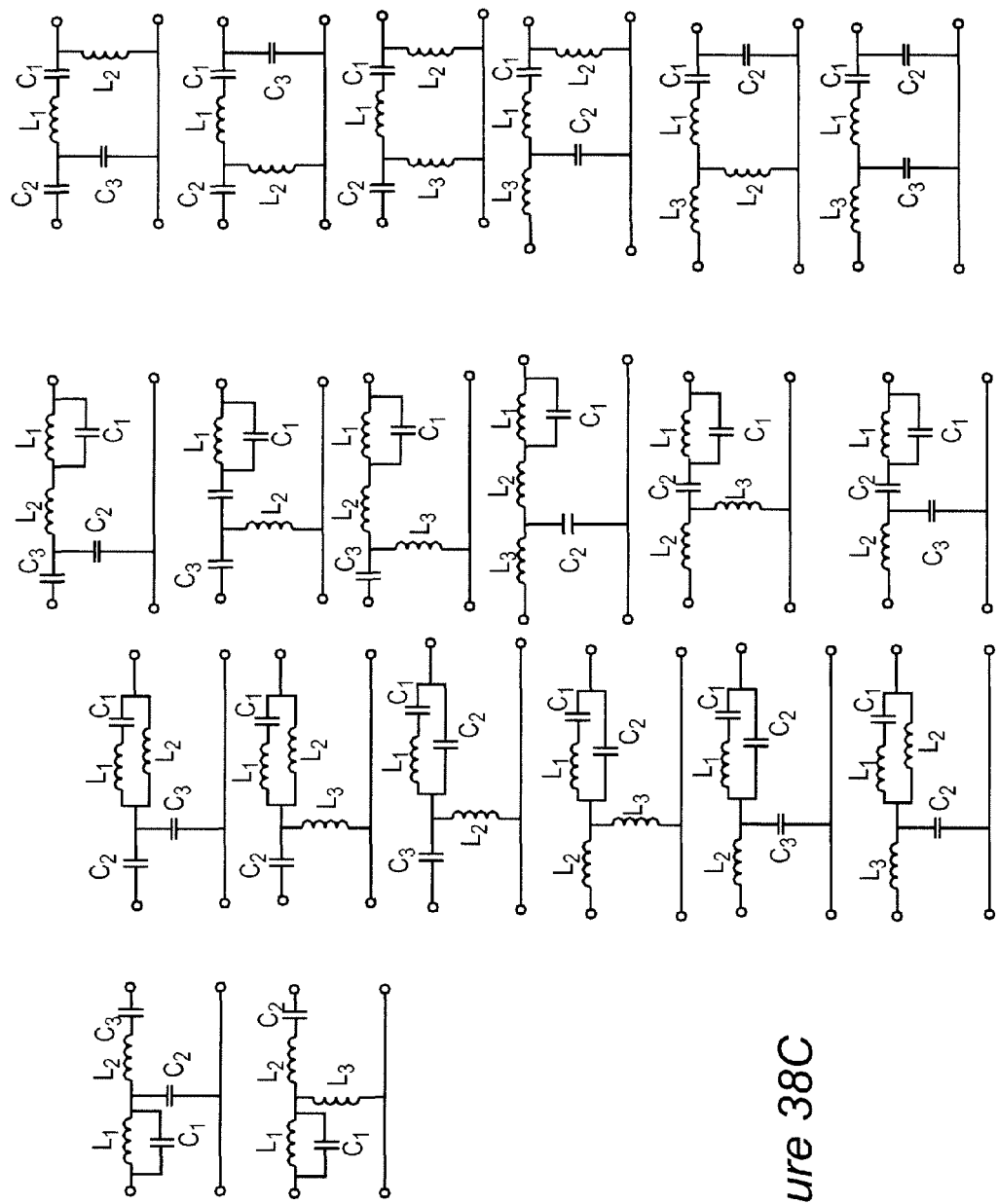
Figure 38D:
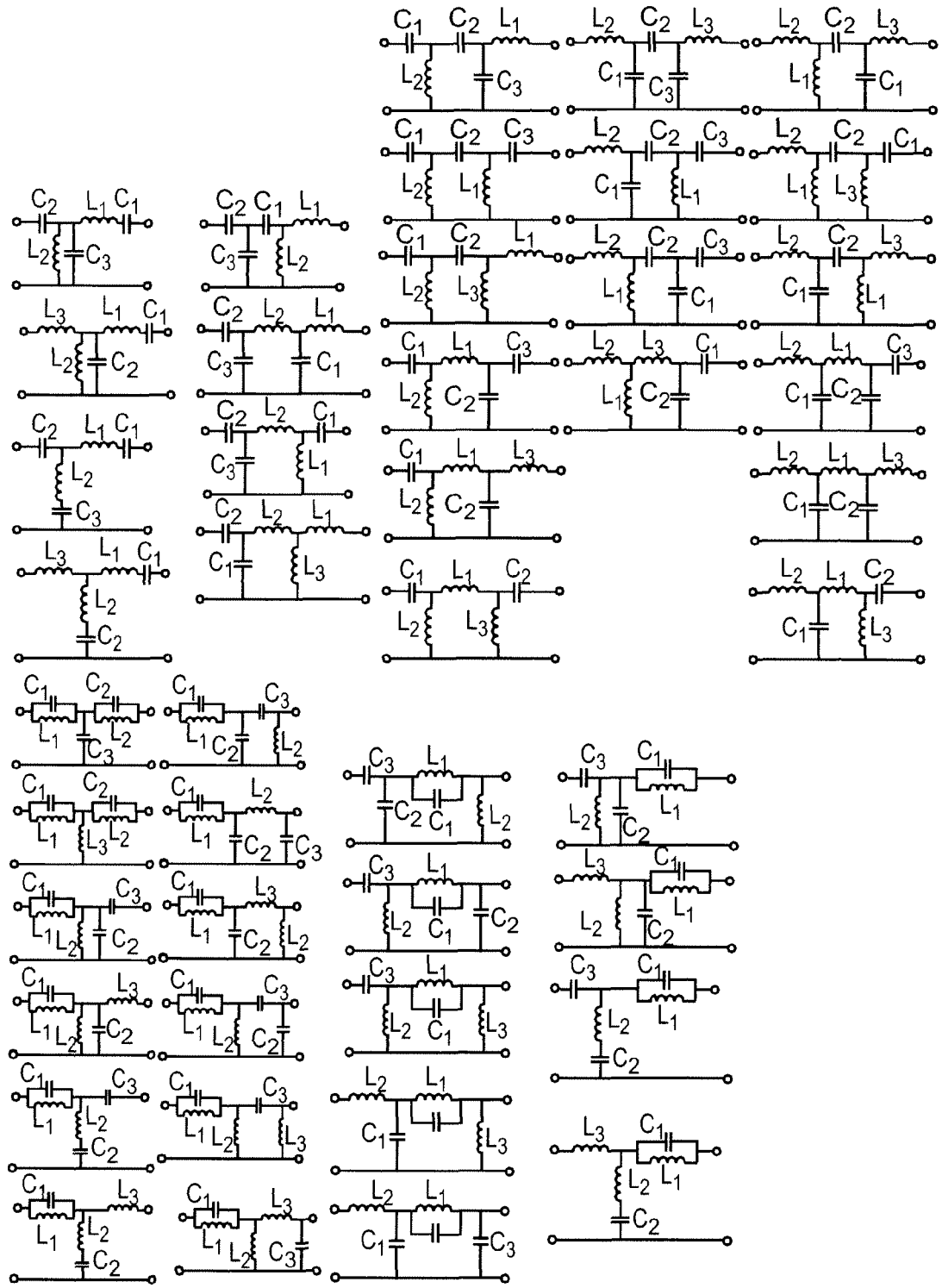
Figure 38E:
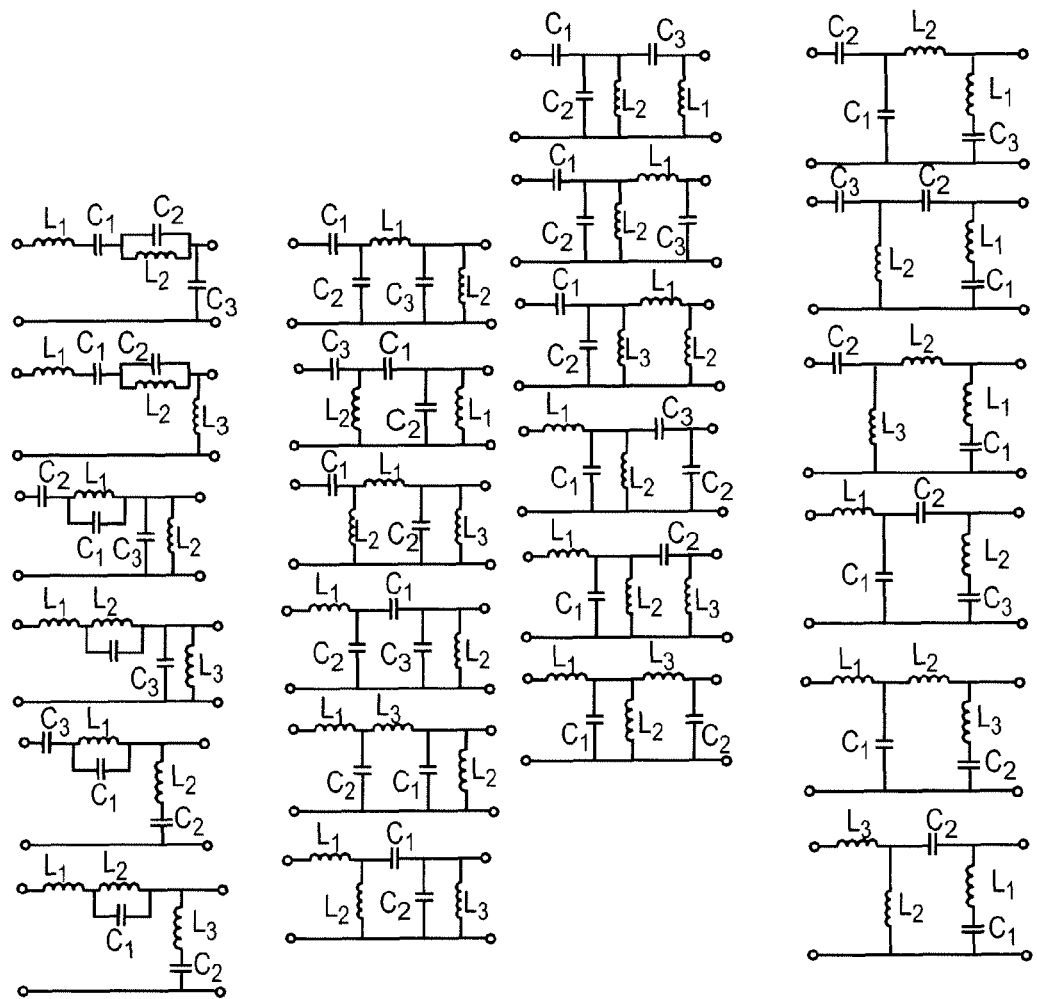
Figure 38F:
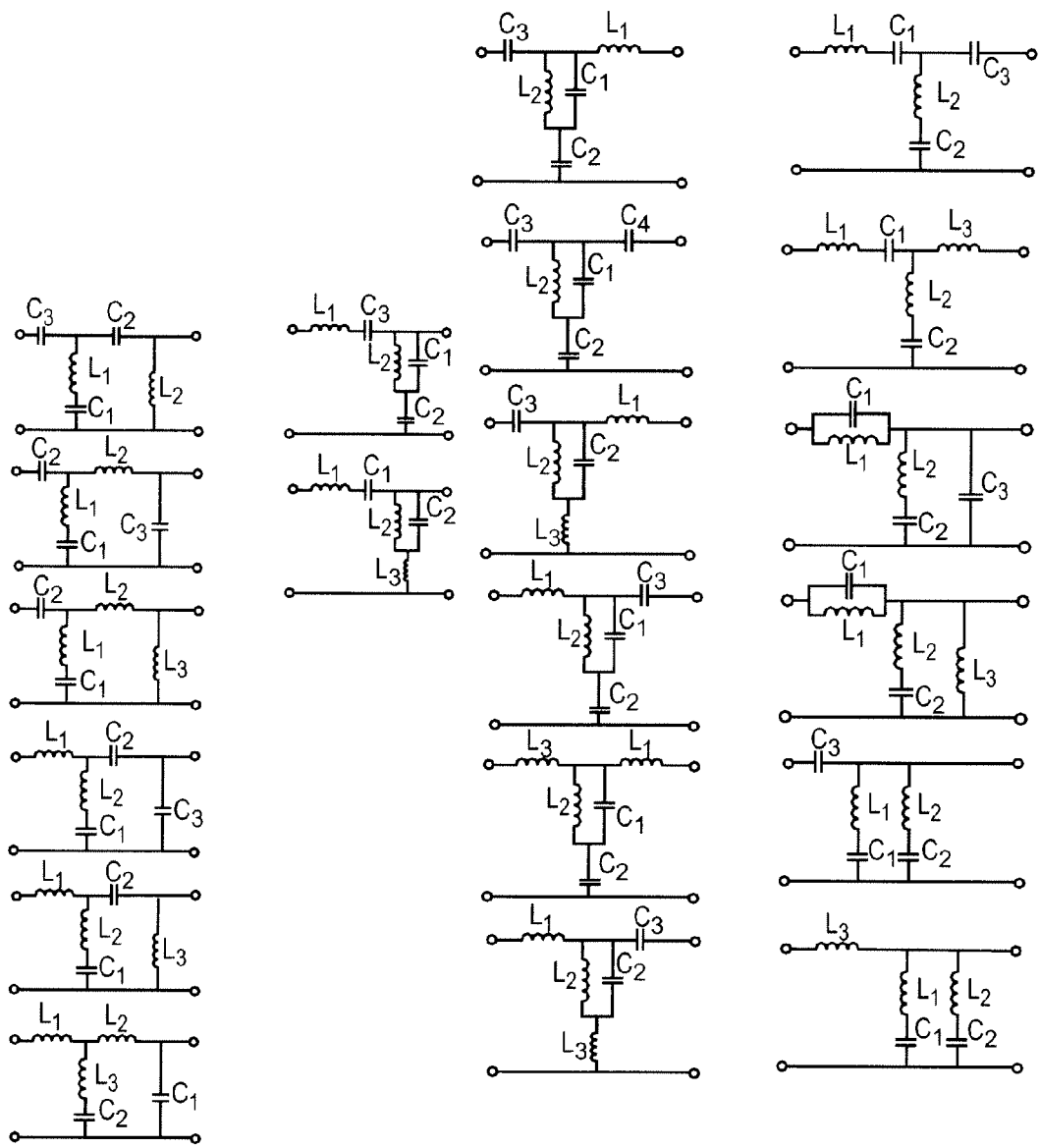
Figure 38G:
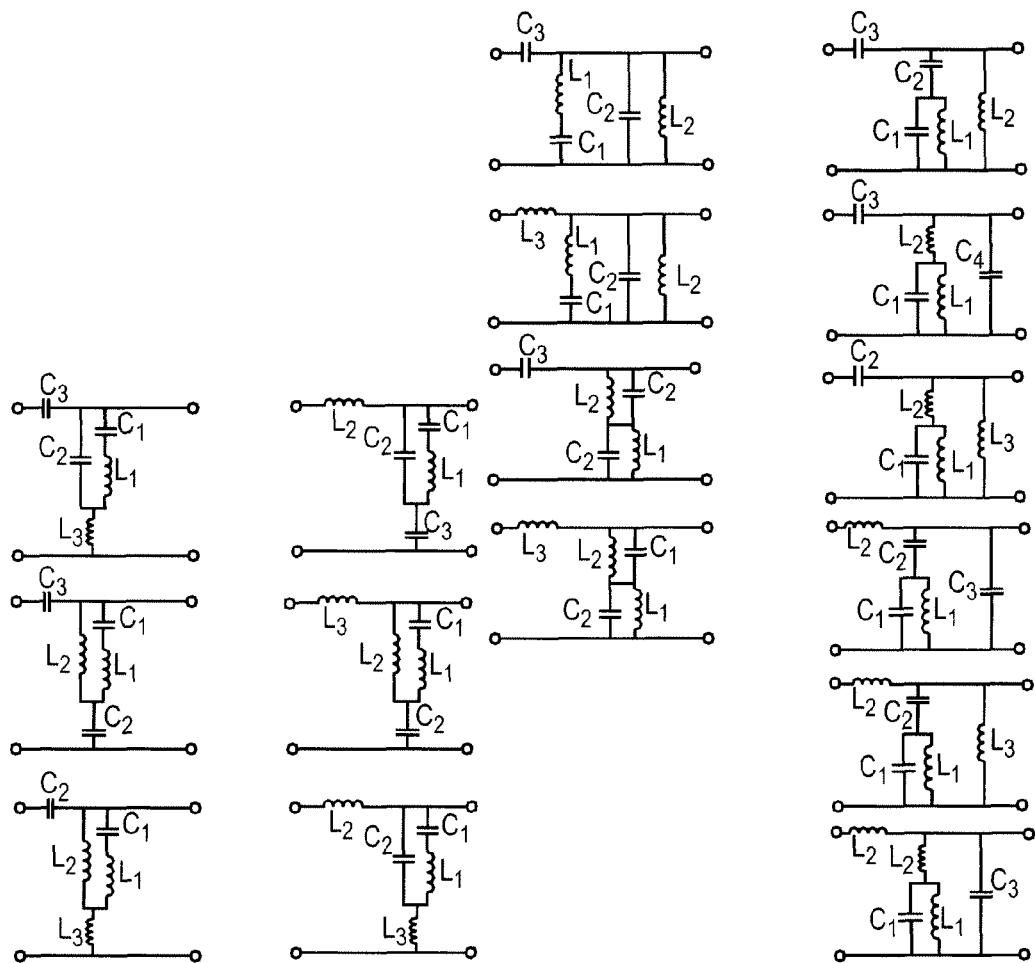
Figure 38H:
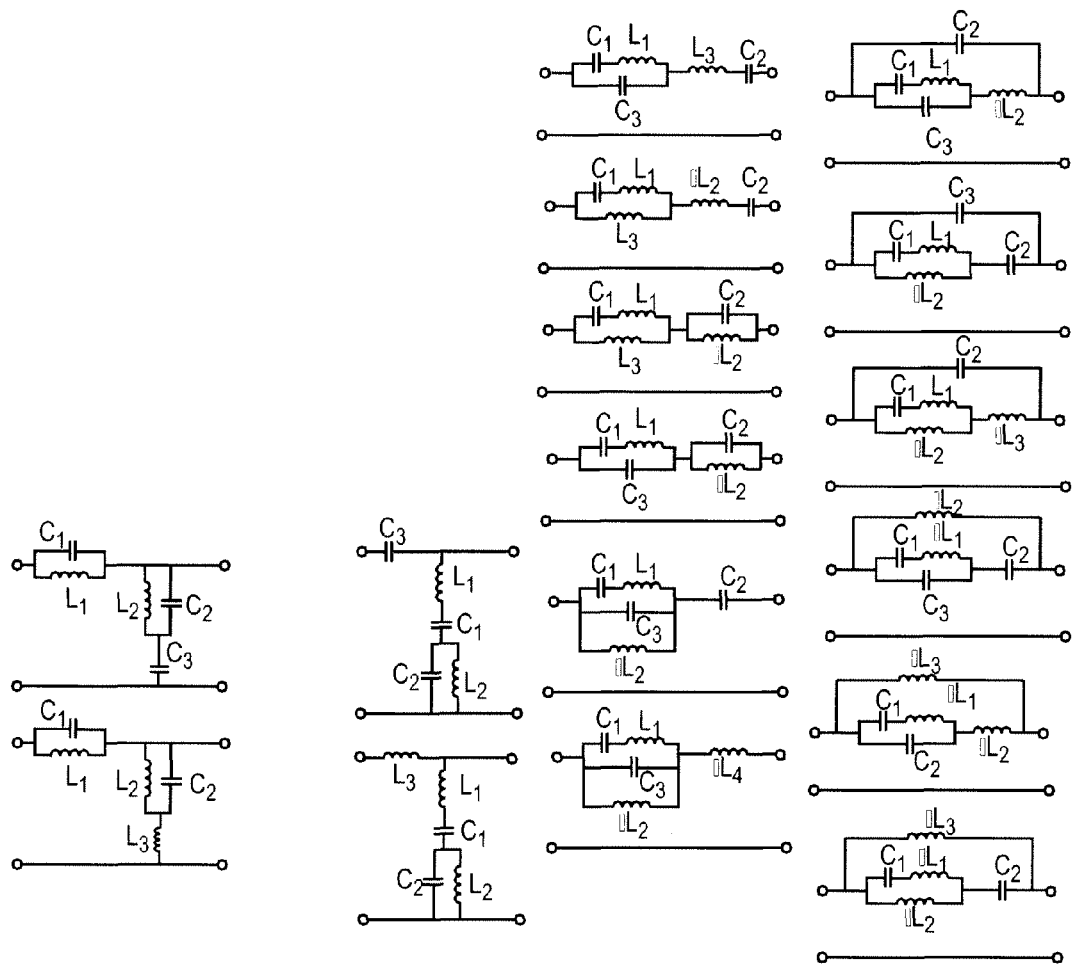
Figure 38I:
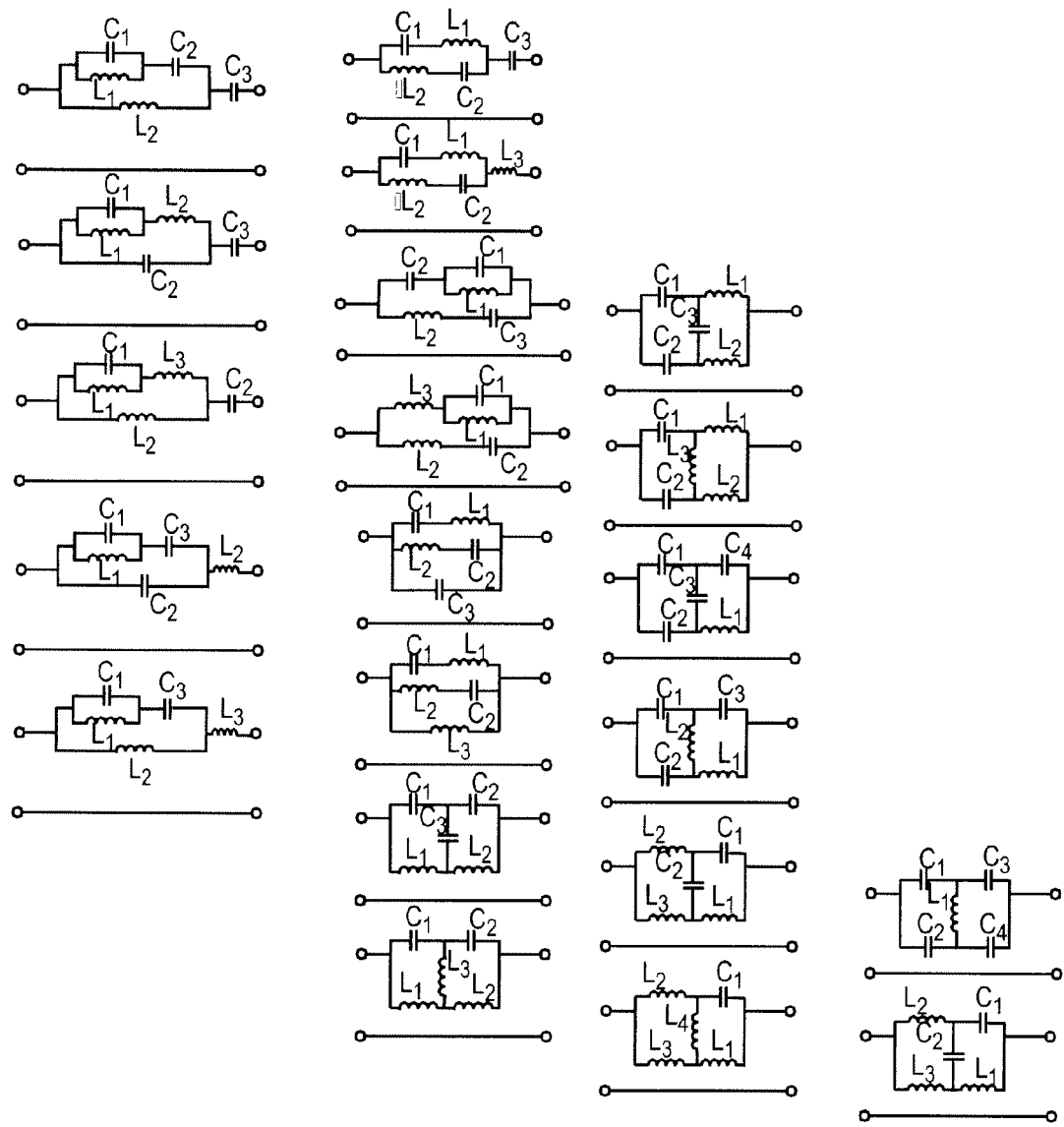
Figure 38J:
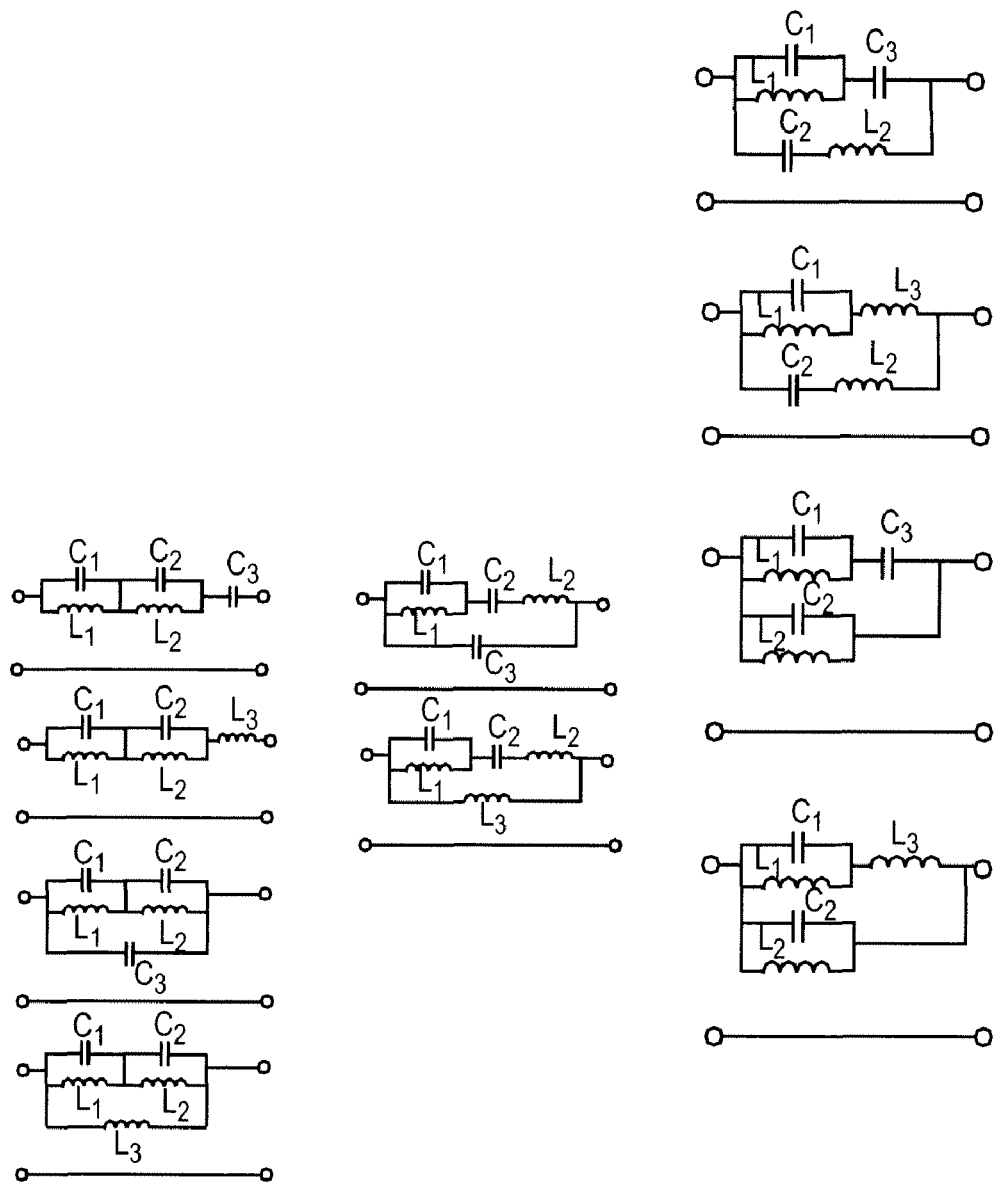
Figure 38K:
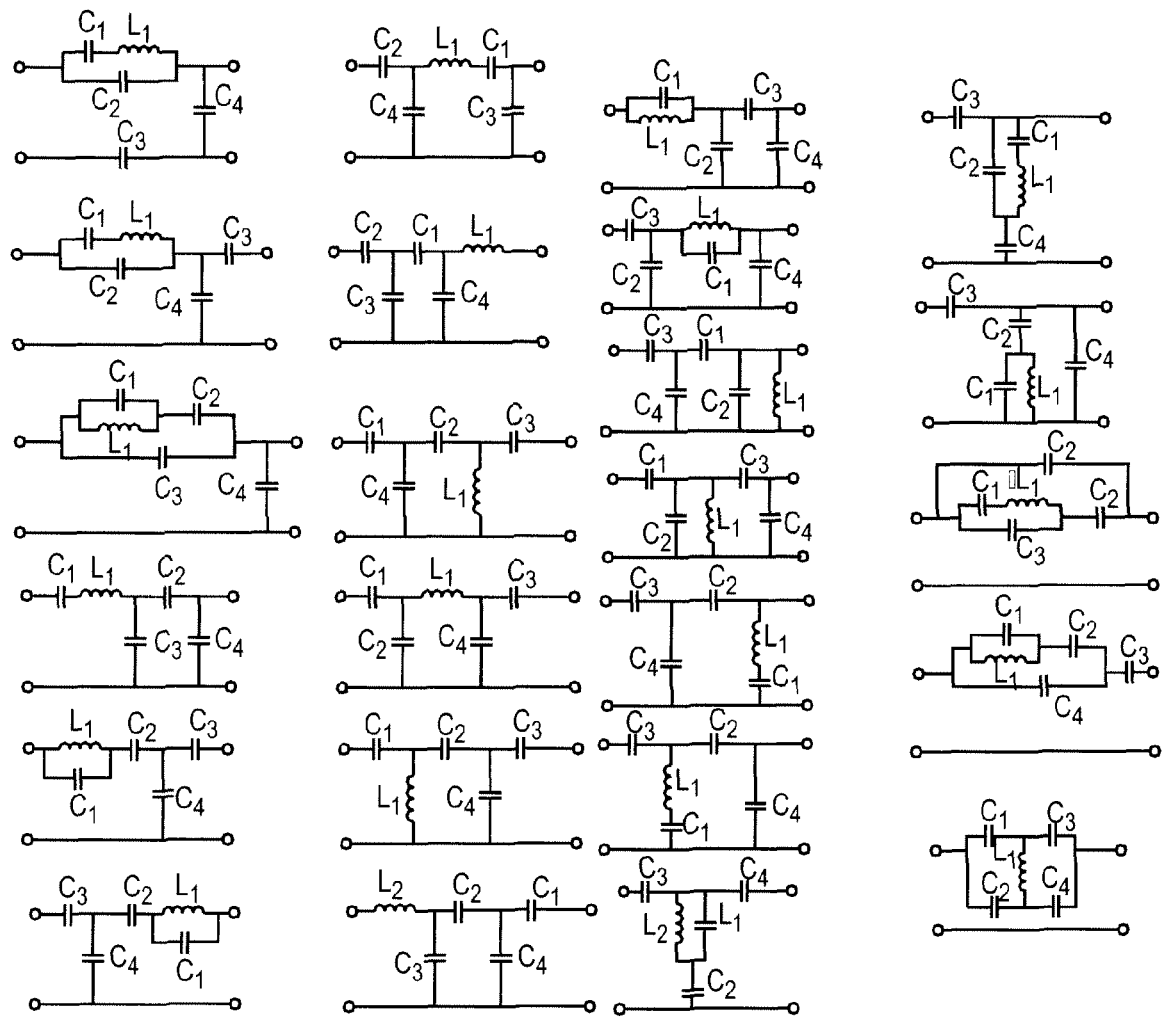
Figure 38L:
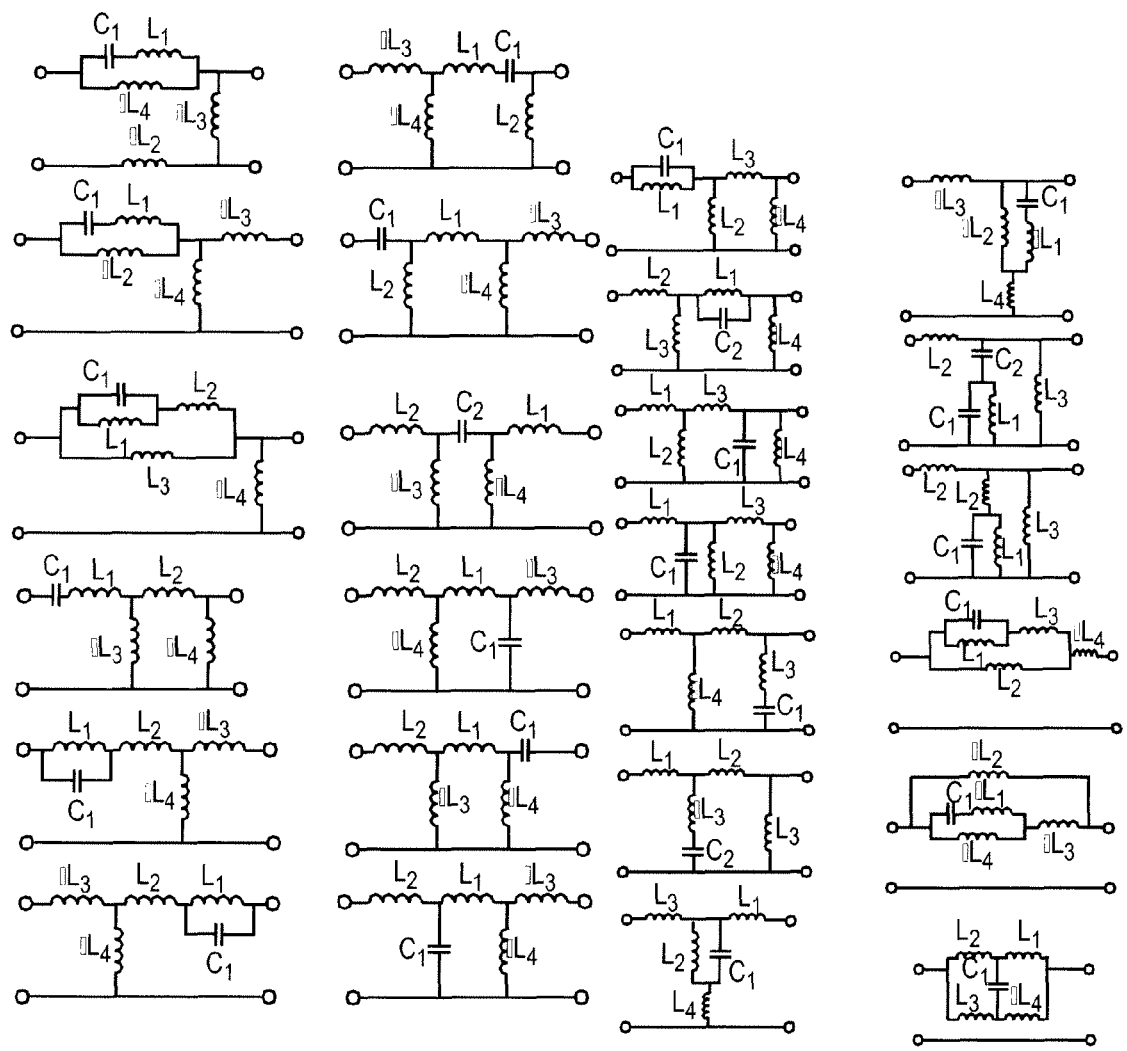
Figure 38M:
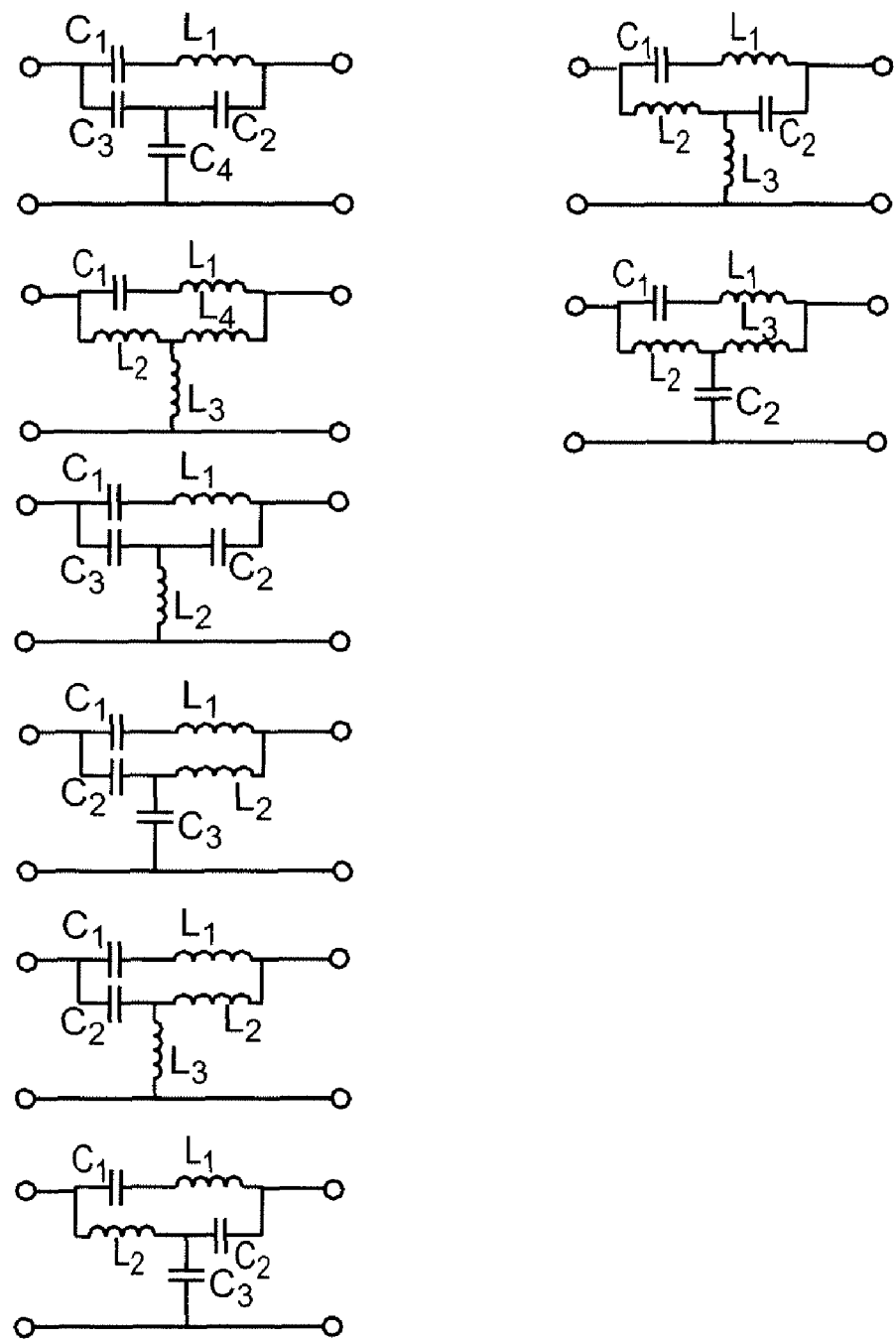

Thus, a resonant tank circuit that includes both a resonant band pass filter and a notch filter can provide both a wide range of voltage gain and over-current protection through frequency control extending only one octave above the resonant frequency of the band pass filter. As will be appreciated by those skilled in the art, many topologies of resonant tank circuits will be evident which meet these few criteria. Some examples of suitable resonant tank circuit topologies are illustrated in FIG. 5 with additional examples illustrated in FIG. 37A-37C.

Figure 7:
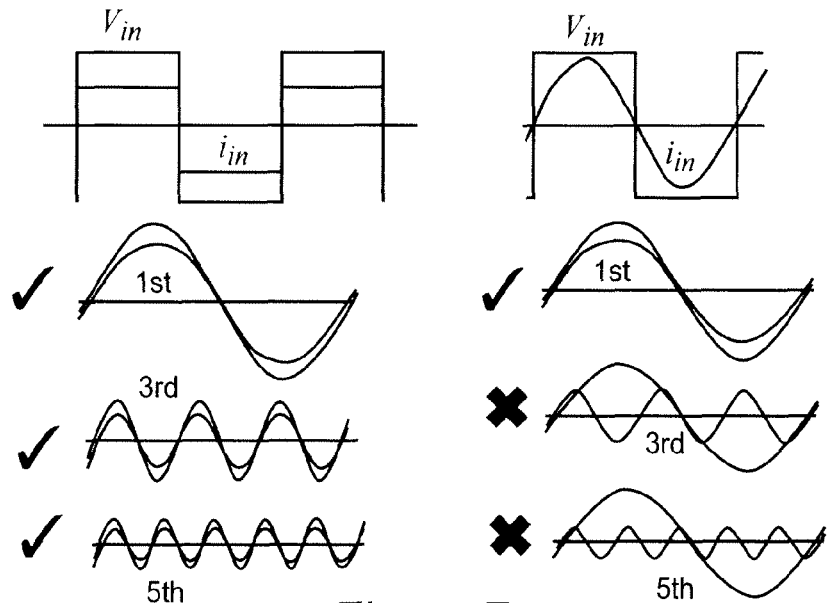
FIG. 7 is a power delivery comparison between PWM and resonant converters.

Some basic differences in voltage gain curve shape will result from the particular topology chosen. For example, the voltage gain curve for circuit (f) of FIG. 5 is shown which exhibits an extremely low voltage gain above the notch filter resonant frequency. Generally, the voltage gain above the notch filter resonant frequency will behave much differently between different tank circuit topologies and may or may not be suitable for a given application while the voltage gain below the band pass resonant frequency (if not compromised by the proximity of resonant frequency of the notch filter) will generally be very desirable for providing a very wide operating range and favorable to reduction of hold-up capacitance. That is, while the low frequency behavior of resonant tank circuits having band pass and notch filters as described above is generally desirable, the controllability of high order harmonics may be compromised as illustrated in FIG. 7.

Specifically, while the high order harmonics of PWM switching converters generally delivers power to the load efficiently for all harmonics, resonant tank circuit power converters deliver power efficiently only at the fundamental resonant frequency of the band pass filter circuit. Higher order harmonics result in circulating energy generation in the resonant circuit with consequent increased conduction losses.

In general, the current and voltage of the primary side in isolated PWM converters are square waveforms and without a noticeable phase shift. Therefore, virtually no circulating energy is generated during the power processing. For the resonant converter, a square-wave inverter and a resonant network transfer and control the fundamental power to the output in a piece-wise sinusoidal manner. As a result, the high order harmonics of input voltage and current of the resonant tank exhibit reactive power, which never contributes to the power delivery. This phenomenon is plotted in FIG. 7. It is also assumed in this illustration that there is no phase shift between the voltage and the current of the resonant converters. With additional phase shift, the circulating energy becomes even larger.

Generally speaking, the amount of power processed by the resonant converter is usually larger than that of a PWM counterpart with the same output power and thus has an adverse effect on the efficiency of resonant converters.

However, while PWM circuits process all the harmonics, the switching performance of main devices is sacrificed. At the turn off edge of the switch cycle, the current is high. Although achieving ZVS can eliminate turn on switching loss, the turn off loss is high. The conventional resonant converters control the fundamental component and limit the turn off current. Therefore, the switching loss of resonant converters is lower than PWM circuits.

In accordance with the invention, a strategy is provided to combine the benefits of PWM converters and resonant converters. Specifically, the invention also provides for utilization of the higher order harmonics for power delivery without compromising the switching performance.

Figure 8:
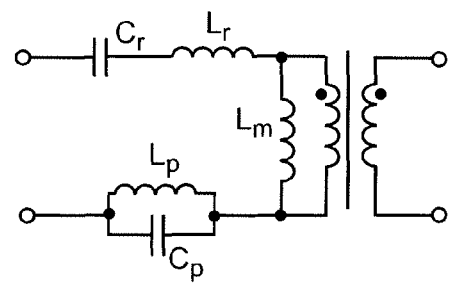
FIG. 8 is an LCLCL, five-element resonant tank circuit in accordance with the invention.

In accordance with the invention, with a further additional resonant element, there are opportunities to combine all the desired performance characteristics discussed above with processing of all harmonics or at least the harmonics containing significant energy. Specifically, with one additional resonant element, a second band pass filter is created. An exemplary LCLCL resonant tank circuit is schematically illustrated in FIG. 8. Compared with the four-element resonant tank circuit discussed above, another extra resonant inductor is inserted. The typical resonant parameters are defined by:

$$f_{01} = \frac{1}{2\pi} \sqrt{\frac{L_r C_r + L_p C_p + L_p C_r - \sqrt{(L_r C_r + L_p C_p + L_p C_r)^2 - 4L_r C_r L_p C_p}}{2L_r C_r L_p C_p}}$$

$$f_{02} = \frac{1}{2\pi} \frac{1}{\sqrt{L_p C_p}}$$

$$f_{03} = \frac{1}{2\pi} \sqrt{\frac{L_r C_r + L_p C_p + L_p C_r + \sqrt{(L_r C_r + L_p C_p + L_p C_r)^2 - 4L_r C_r L_p C_p}}{2L_r C_r L_p C_p}}$$

$$f_{04} = \frac{1}{2\pi} \frac{1}{\sqrt{C_r(L_r + L_m + L_p)}}$$

Figure 6:
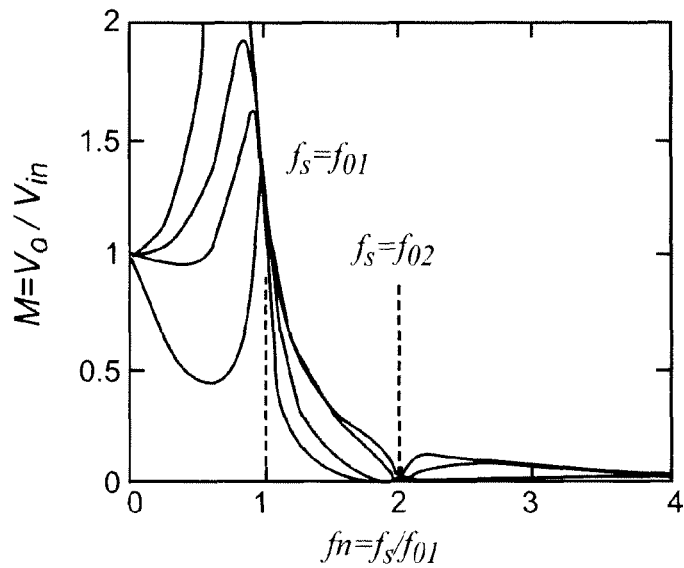
FIG. 6 is a voltage gain curve of the LCLC circuit (f) in FIG. 5.
Figure 9:
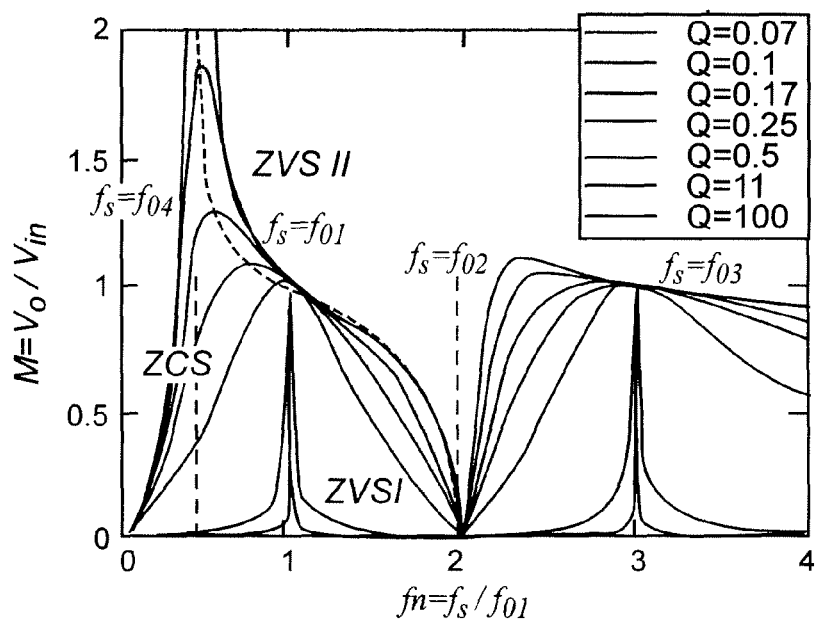
FIG. 9 is a voltage gain curve of the LCLCL circuit of FIG. 8, FIG. 10 provides a normalized output current comparison between the circuit of FIG. 1 and the invention, FIG. 11 contains schematics of exemplary five-element tank circuits.

The voltage gain of the proposed LCLCL resonant converter is illustrated in FIG. 9. Conceptually, Lr, Cr and Lp contribute to the first band pass filter at low frequency. The second band pass filter consists of Lr, Cr and Cp, which dominate at high frequency. The first band pass filter can help to deliver the fundamental component to the load in the manner of resonant converters discussed above. The second band pass filter enhances the power delivery with utilization of higher harmonics by enhancing the voltage gain at frequencies above the resonant frequency of the notch filter (or near the third harmonic and above) as may be appreciated by a comparison of FIG. 9 with FIG. 6. (It should be appreciated that the switching frequency will be near $f_{01}$ in the absence of an overload condition and thus the voltage gain for higher harmonics can be comparable to nominal voltage gain at the fundamental switching frequency and above that of the LLC circuit voltage gain at comparable frequencies to enhance power transfer to the load without compromising the current limiting function of the notch filter.) Consequently, with injection of higher order harmonics, the reactive power circulating in the resonant tank can be reduced.

Lower RMS current and lower conduction loss can thus be achieved using a resonant tank circuit having two band pass filters having resonant frequencies both above and below the resonant frequency of the notch filter. Note that if the notch filter resonant frequency is set at an even multiple of the fundamental/nominal switching frequency as discussed above, the resonant frequency of the second band pass filter can preferably and advantageously be set at the first odd multiple of the fundamental/nominal switching frequency which, as discussed above, suitably minimizes the interaction between the notch filter and the second (or further) additional band pass filter resonant frequencies placed at an odd multiple of the fundamental/nominal switching frequency.

On the other hand, to maintain very low switch current of main switches $Q_1$ and $Q_2$, highly distorted current should be avoided. Hence, excessive high order harmonics generally should not be included in the resonant tank under currently preferred design criteria. Thus, the second band pass filter is designed to provide adequate damping at very high frequency. Therefore, the performance of the resonant converter is improved. In such an application, the resonant frequency of the second band pass filter is designed at three times the nominal switching frequency with a reduction in voltage gain or increase in damping that reduces the power transfer at the fifth and higher harmonics in which relatively little power is generally present. That is, $f_{03}=3f_{01}$. Clearly, the third order harmonic assists in transferring power. From the Fourier analysis, 10% power can be processed by the third order harmonic. The circulating energy is therefore reduced by a similar amount while retaining the simple but highly effective over-current protection in accordance with the invention as discussed above.

Figure 11:
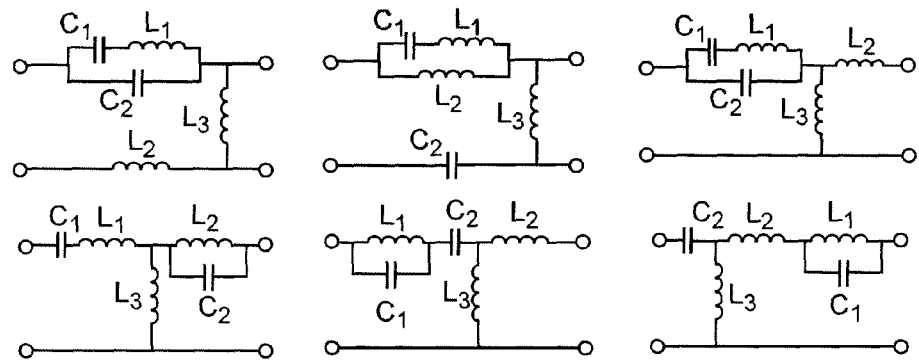

As with the four-element resonant tank circuit described above, the concept of a five-element resonant tank circuit providing two band pass filters and a notch filter can be achieved using numerous circuit topologies as will be apparent to those skilled in the art. Examples of suitable topologies are schematically shown in FIG. 11. Additional suitable topologies for five-element resonant circuits are illustrated in FIGS. 38A-38M.

Figure 35B:
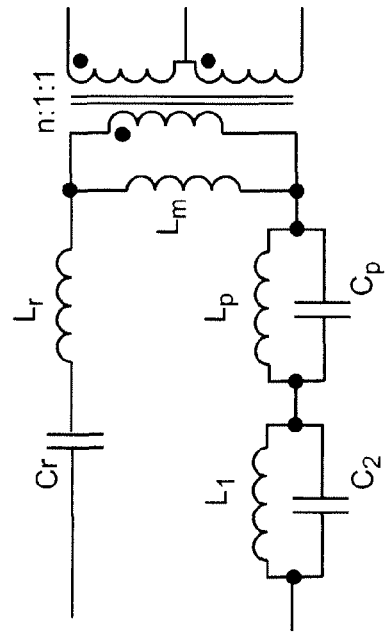
FIGS. 35A and 35B are schematic diagrams of fifth-order circuits for transferring higher order (e.g. fifth harmonic) energy to the load.
Figure 35A:
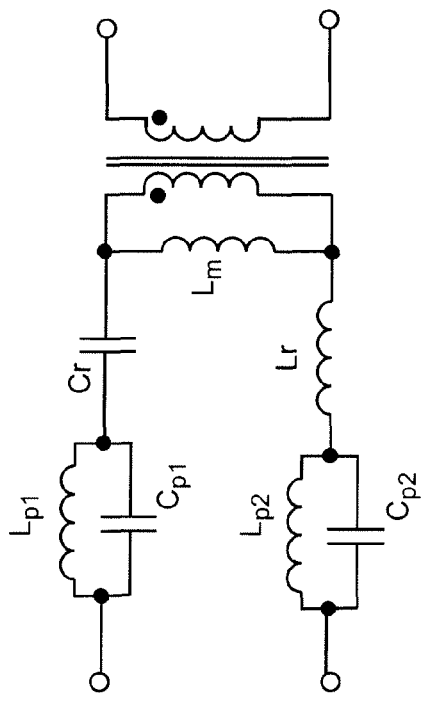
Figure 36:
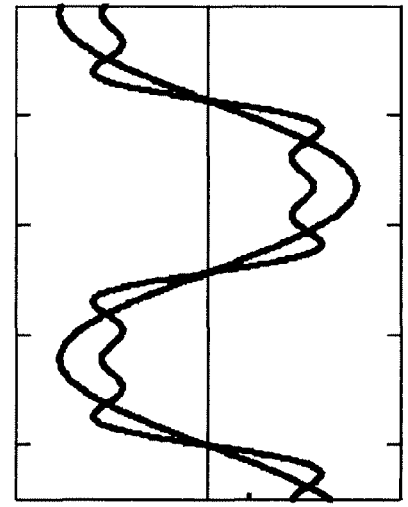
FIG. 36 is a voltage gain plot and time domain current waveforms of the circuit of FIG. 35A or 35B, FIGS. 37A, 37B, 37C and 38A, 38B, 38C, 38D, 38E, 38F, 38G, 38H, 38I, 38J, 38K, 38L and 38M illustrate additional suitable tank circuit schematic diagrams for four-element and five-element tank circuits, respectively.
Figure 36:
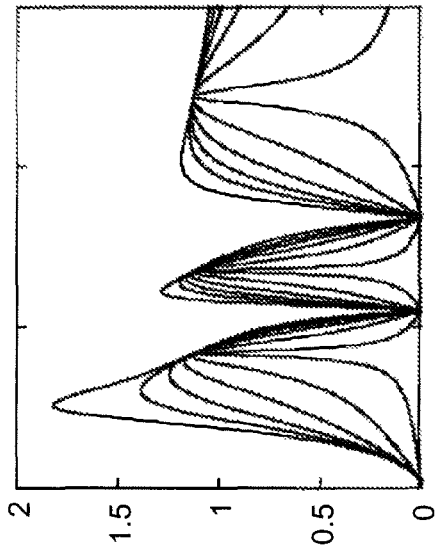

On the other hand, in some applications, it may be desirable to provide for transfer of power at harmonics above the third harmonic. This can be accomplished by reducing the damping provided by the second band pass filter. However, doing so may compromise the low bandwidth frequency controlled current-limiting effects of the notch filter as described above. The simple solution to this compromise of current-limiting, however, is to introduce one or more additional notch and band pass filters in the tank circuit as illustrated in FIGS. 35A and/or 35B for a fifth order tank circuit that includes the fifth harmonic. The voltage gain curve and time domain current waveforms for this fifth-order tank circuit are shown in FIG. 36. The same principle can be extended to any desired harmonic where sufficient energy to justify such additional filters is present.

Figure 10:
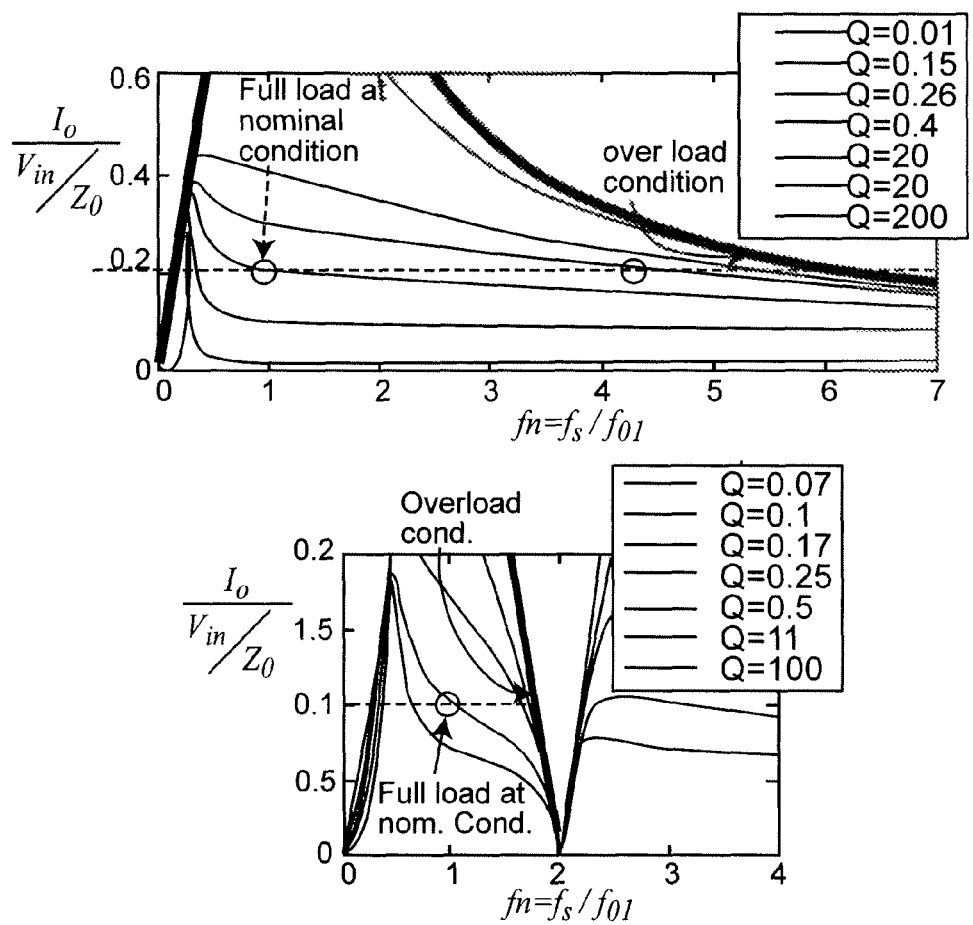

Specifically, referring to FIG. 10, a comparison of normalized output current curves for the LLC and LCLCL circuits discussed above is shown. The nominal full load current is shown at $f_o$ for both converters with the overload condition shown at an even higher current between $4f_o$ and $7f_o$ for the LLC converter while, for the LCLCL converter, current can be brought to zero at $2f_o$ as described above.

Figure 12:
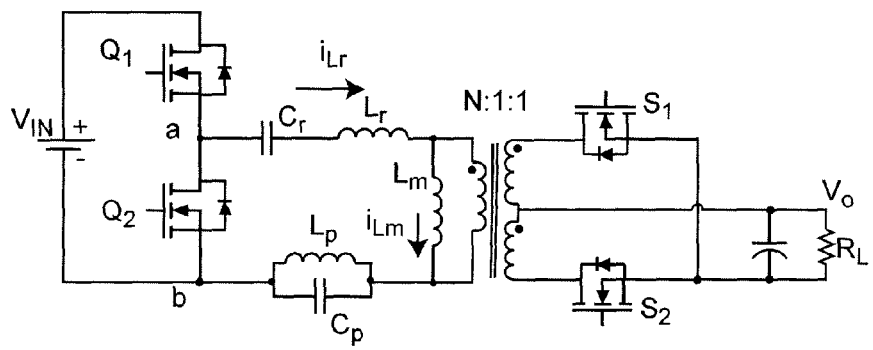
FIG. 12 is a schematic diagram of a preferred embodiment of the invention.
Figure 21:
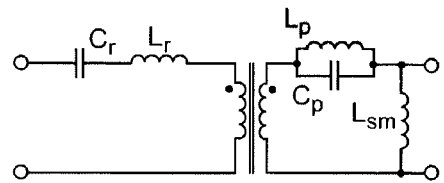
FIGS. 21, 22 and 23 are schematic diagrams showing how the resonant tank circuit can be distributed over both the primary and secondary sides of a resonant tank circuit, whether or not the inductive elements are integrated and whether or not a transformer is included.
Figure 22:
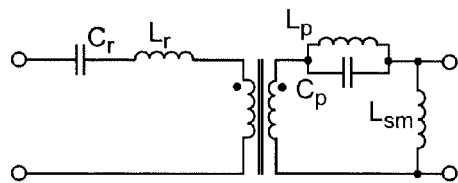

A preferred multi-element resonant converter in accordance with the invention is implemented and illustrated in FIG. 12. The LCLCL resonant tank is selected as the core of this converter. The half bridge topology is adopted as the primary side structure. The secondary side is, for example a center tapped transformer configuration with synchronous rectifiers (SRs). Similarly, the secondary side may be extended to other types of output structures, such as full-bridge, voltage doublers, current doubler structures and the like. Other implementations may extend to other types of primary and secondary side structures, such as full bridge, stacked half bridge and three-level structures and the like as will be apparent to those skilled in the art in view of the above discussion and the particular examples which will be discussed below in connection with FIGS. 24-34. In general, the secondary side with synchronous rectifiers (SR) is considered to be preferable for low voltage output applications. The secondary side SR switching devices $S_1$, $S_2$, can be replaced by diodes for high voltage applications. In such a case, complicated SR driving circuits can be saved. For front-end converters, SR output is applied to increase the efficiency. It should also be appreciated, as will be evident to those skilled in the art in view of the above discussion, that the transformer may or may not be desirable for particular applications (e.g. where isolation is or is not required). Further, as illustrated in FIGS. 21-22, when a transformer is included, the tank circuit may be divided or distributed between the primary and secondary sides of the transformer circuit.

Figure 23:
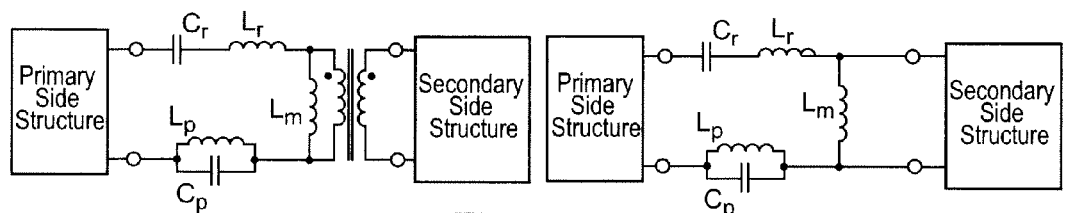
Figure 24:
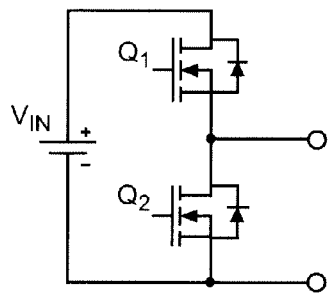
FIGS. 24, 25, 26, 27 and 28 are schematic diagrams of exemplary primary side circuits suitable for practice of the invention.
Figure 25:
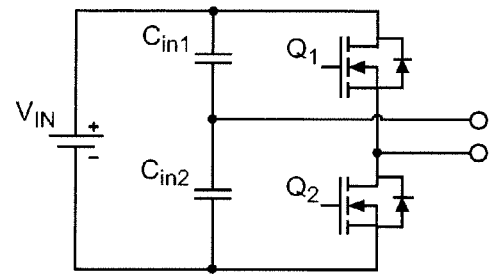
Figure 26:
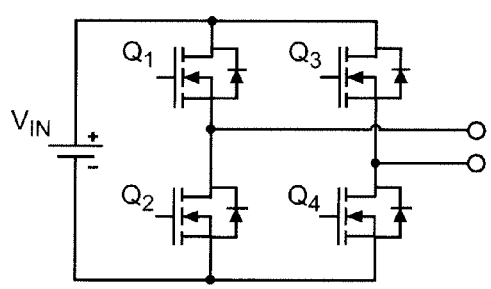
Figure 27:
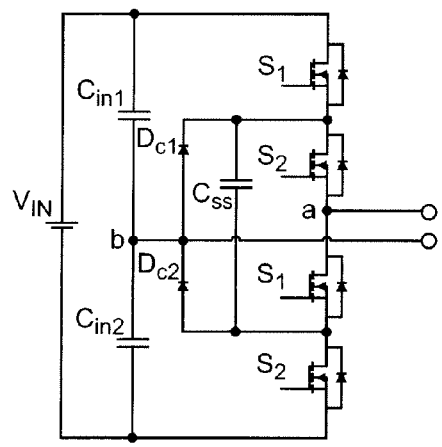
Figure 28:
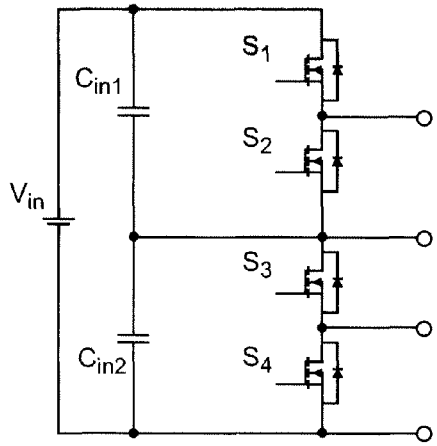
Figure 29:
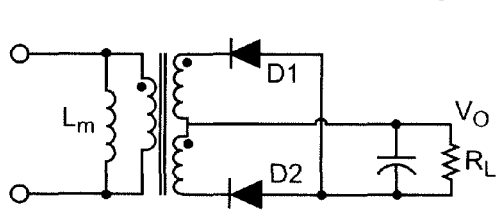
FIGS. 29, 30, 31, 32, 33 and 34 are schematic diagrams of exemplary secondary side circuits suitable for practice of the invention.
Figure 30:
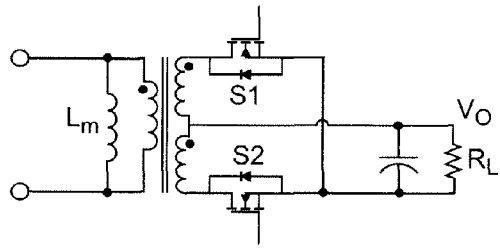
Figure 31:
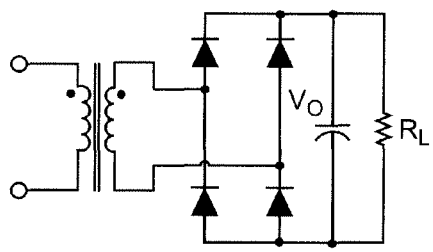
Figure 32:
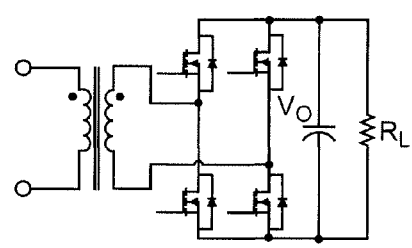
Figure 33:
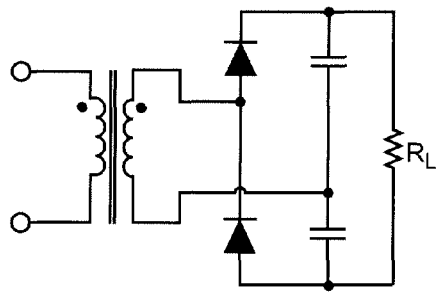
Figure 34:
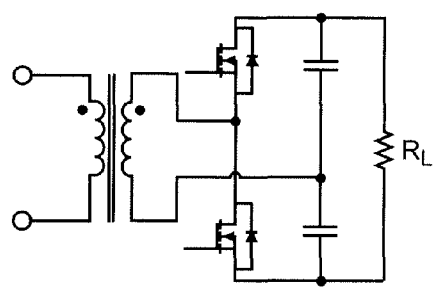

Also, it should be appreciated that, whether or not a transformer is included in the tank circuit, the input and output circuits (e.g. the primary and secondary side structures may be freely chosen to accommodate any particular power or design requirements. For example, any of the exemplary circuits of FIGS. 24-28 can be used for the primary side input switch structure of FIG. 23 while any of the exemplary circuits of FIGS. 29-34 can be used as the secondary output or rectification side structure of FIG. 23.

Returning again to FIG. 9, there are several operational regions shown for the LCLCL resonant converter. For MOSFETs, ZVS operation is preferred. In ZVS region I, the voltage gain of the LCLCL resonant converter is lower than unity. In ZVS region II, the voltage gain of the LCLCL resonant converter is higher than unity. As a result, the LCLCL resonant converter can achieve either boost or buck function as may be required, consistent with ZVS operation. For front-end converters, higher voltage gain is necessary during the hold-up time. Therefore, ZVS region II is favorable during the hold-up time operation. For overload conditions, such as startup and short output conditions, ZVS I is preferred to limit the current while maintaining ZVS operation to further limit electrical stress on components.

Figure 13:
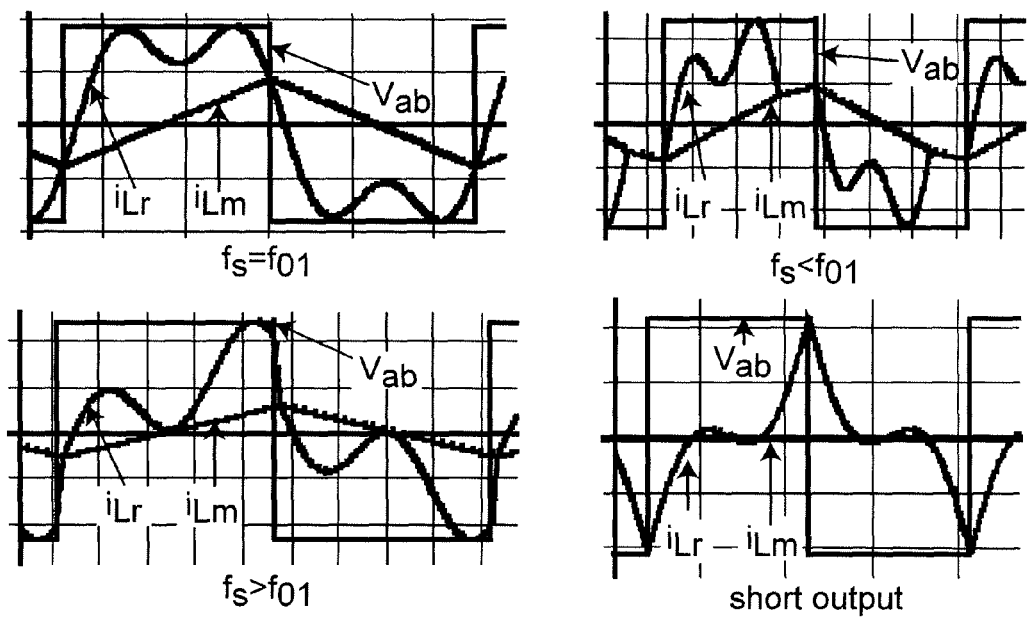
FIG. 13 illustrates simulated waveforms for different operating regions of FIG. 9, FIGS. 14A and 14B illustrate nominal full load and short circuit waveforms of a prototype of the invention.

The typical simulated waveforms of the proposed LCLCL resonant converter are shown in FIG. 13. The LCLCL resonant converter can achieve ZVS for the primary side and ZCS for the secondary side. With proper design, the magnetizing current $iL_m$ can help to achieve ZVS for zero load to full load range. At the nominal condition, the LCLCL resonant converter operates at the resonant frequency $f_{o1}$, where close to ZVS and ZCS (ZVZCS) conditions can be achieved for primary side devices. The switching current of the secondary side rectifiers reduces to zero naturally. The reverse recovery issue is thus eliminated, as well and very low switching losses are accomplished due to soft switching operation. Furthermore, in sharp contrast to traditional resonant converters, the third order harmonic is injected and significantly improves the power processing and overall efficiency; transferring power that would otherwise be dissipated as conduction losses. Hence, both peak current and RMS current of the resonant tank are reduced. Conduction losses and current stresses of devices are alleviated.

For this simulation, Lm is designed as 13 μH according to ZVS conditions as well as based on the holdup voltage gain requirement. Nominal frequency $f_{o1}$ is chosen as 1 MHz. Based on equations for $f_{o1}$-$f_{o4}$ and:

$$Z_0 = L_r 2\pi f_{o1}$$

$$Q = \frac{Z_0}{N^2 R_L}$$

$$f_n = f_s / f_{o1}$$

$$L_n = L_m / L_r$$

where N represents the transformer turns ratio and $R_L$ represents the load, Lr=1 μH, Cr=11.3 nF, Lp=0.9 μH and Cp=6.8 nF are obtained.

As shown in FIG. 9, in ZVS region I, the voltage gain of the LCLCL resonant converter is lower than unity and drops sharply with increasing frequency. When the switching frequency is close to the resonant frequency $f_{o2}$, the voltage gain (and output voltage) is almost zero. For the most serious case, in short output, the operation waveforms are illustrated in FIG. 13, waveform (d). The primary side current is limited and does not exceed the current rating of the power devices. At the same time, ZVS can be achieved.

Thus, very low voltage stress can be achieved even in worst-case conditions. In overload or short conditions, the LCLCL resonant converter can operate close to $f_{o2}$. Therefore, the output current can be still limited to very low value and the circuit can survive without damage to components. The switching frequency range required to achieve this effect is also well limited and is the superior characteristic of the proposed LCLCL resonant converter. In contrast, for other conventional resonant converters, such as an LLC resonant converter, operation frequency is required to increase several times higher to achieve the same or even a lesser protection function which, for high frequency operation (MHZ), is not practical, as discussed above due to the limitations of gate driving circuits and as well as practical thermal design.

Figure 14A:
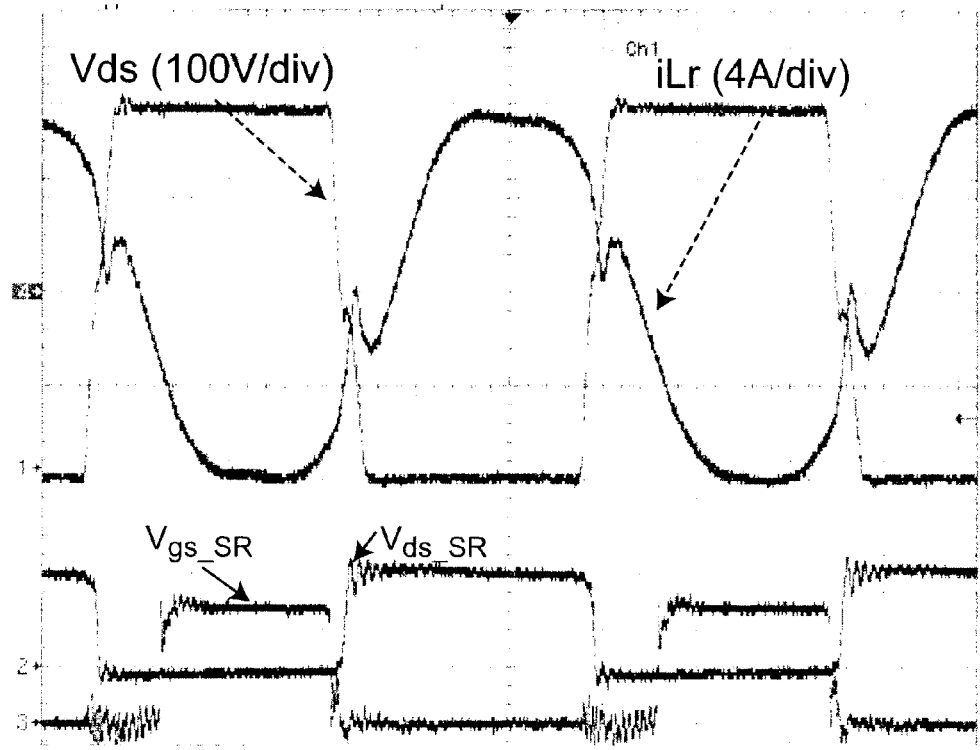
Figure 14B:
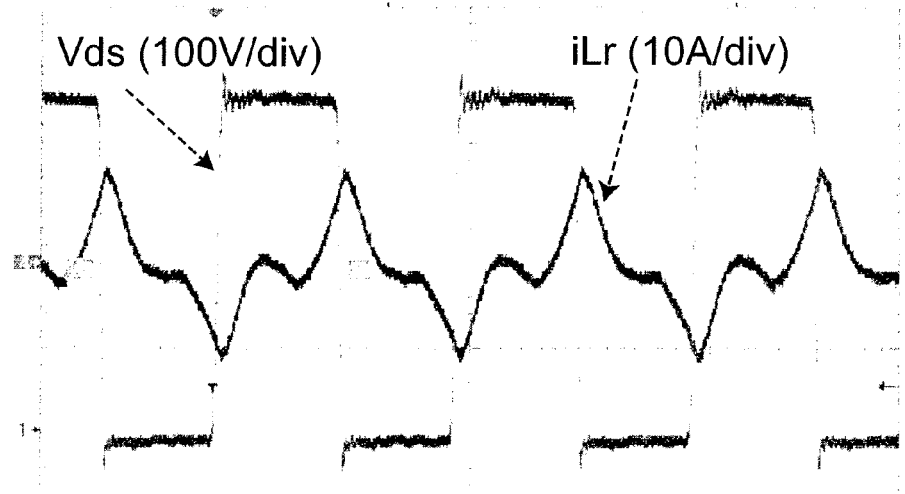

To demonstrate the efficacy of the present invention waveforms of a 1 kW, 1 MHz, 400V/48V prototype are shown in FIGS. 14A and 14B for nominal full load and short circuit conditions respectively. The efficiency of power transfer is evident from FIG. 14A while the strongly limited current is evident from FIG. 14B.

With the additional resonant elements in accordance with the invention, the passive component size is increased. To achieve the high power density, passive component integration techniques may be applied. For example, the magnetic components Lm, Lr and the transformer have been successfully integrated into one component. In this prototype, Lp is the only magnetic component which is not integrated.

The power density of the prototype is 86 W/in$^3$. The efficiency is 95.5%, which is very high for MHZ frequency operation. The waveforms for nominal condition are very close to a square waveform with low RMS current. The short circuit protection of LCLCL resonant converter is also verified by the experimental result. When the output is shorted, the LCLCL resonant converter can operate at 1.8 MHz. The output current is limited without compromising the operation of the converter.

As a perfecting feature of the invention which is not necessary to the successful practice of the invention in accordance with its basic principles, all inductive elements can be integrated into a single electrical component as is preferred to reduce costs, weight and size of the power converter in accordance with the invention, thereby maximizing power density.

Further, preferred techniques for such integration are suitable for preferred printed circuit board planar transformer structures but it is to be understood that other configurations can also be employed.

Figure 15:
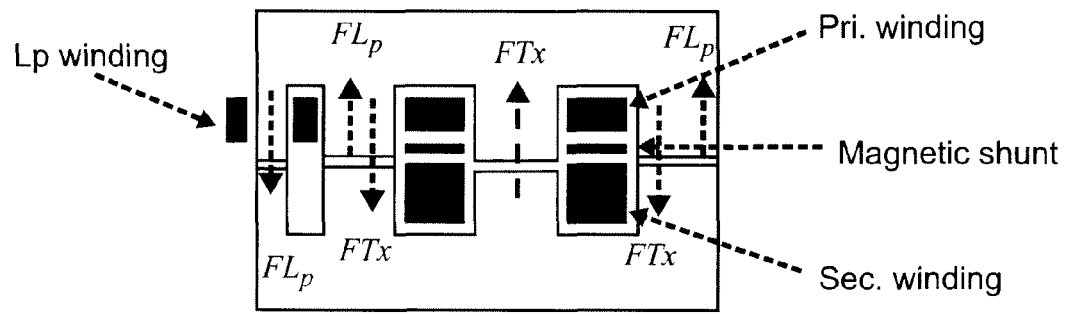
FIGS. 15 and 16 are a schematic representation and equivalent magnetic circuit of a first embodiment on an integrated inductor/transformer for implementation of the invention.
Figure 16:
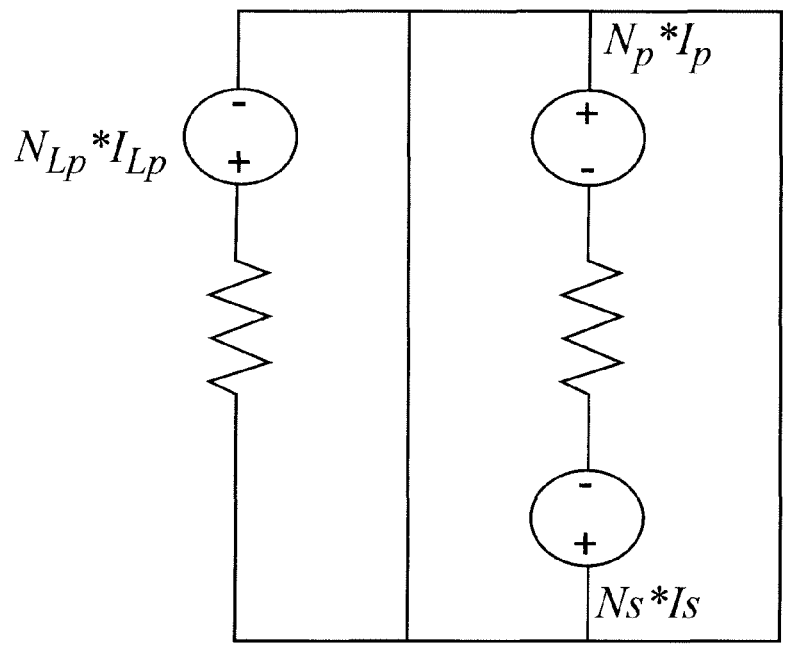

A first integrated structure illustrated in FIG. 15 (with the equivalent magnetic circuit illustrated schematically in FIG. 16) employs two "E" shaped three aperture cores (e.g. a so-called EE configuration) with each core having four legs. An air gap is provided between the E-shaped cores. A so-called EI core configuration (e.g. one E-shaped core and a more or less straight core element) can also be employed. There are three sets of windings: the primary and secondary windings correspond to the transformer illustrated in FIG. 12, a magnetic shunt and an $L_p$ winding.

The primary and secondary transformer windings are preferably placed on an internal leg of the e-shaped core (e.g. through two of the core apertures) and are magnetized with main transformer flux, FTx. a magnetic shunt is preferably placed between the primary and secondary windings but may not be necessary.

The magnetic shunt comprises a layer of high (compared with air of the air gap) permeability material. Thus, increased leakage flux will be generated by the magnetic shunt. Whether the leakage flux is generated by a magnetic shunt or the air gap alone, the leakage flux can be utilized as $L_r$ in the circuit of FIG. 12.

The $L_p$ winding is preferably placed on an exterior leg of the E-shaped core (e.g. passing through the third core aperture) and is magnetized by the flux, $FL_p$, of the inductor $L_p$. With a proper winding arrangement, the flux of $L_p$ and the main flux can be canceled to some degree to reduce core losses and allow reduced core material and size.

Figure 17:
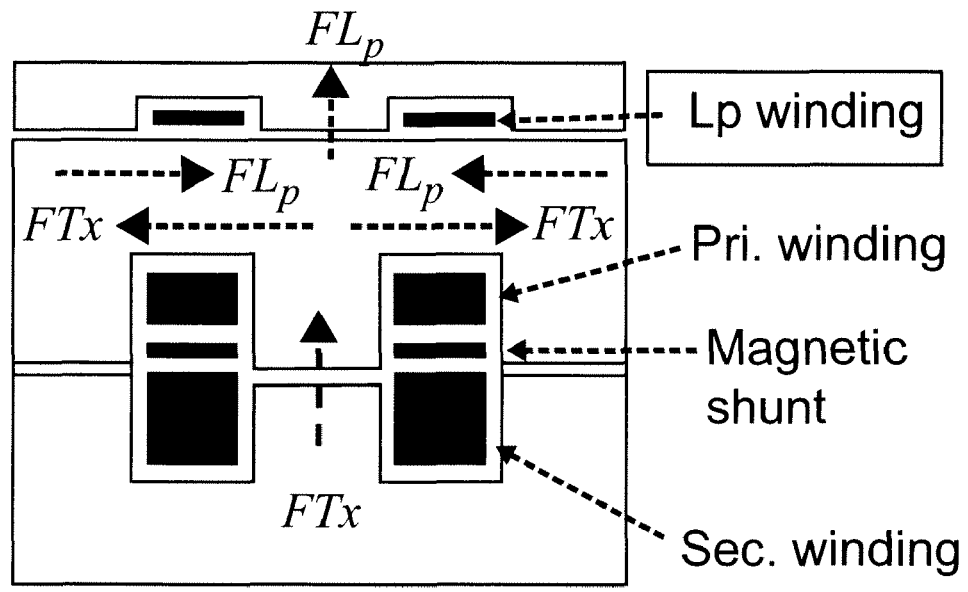
FIGS. 17 and 18 are a schematic representation and equivalent magnetic circuit of a second embodiment on an integrated inductor/transformer for implementation of the invention.
Figure 18:
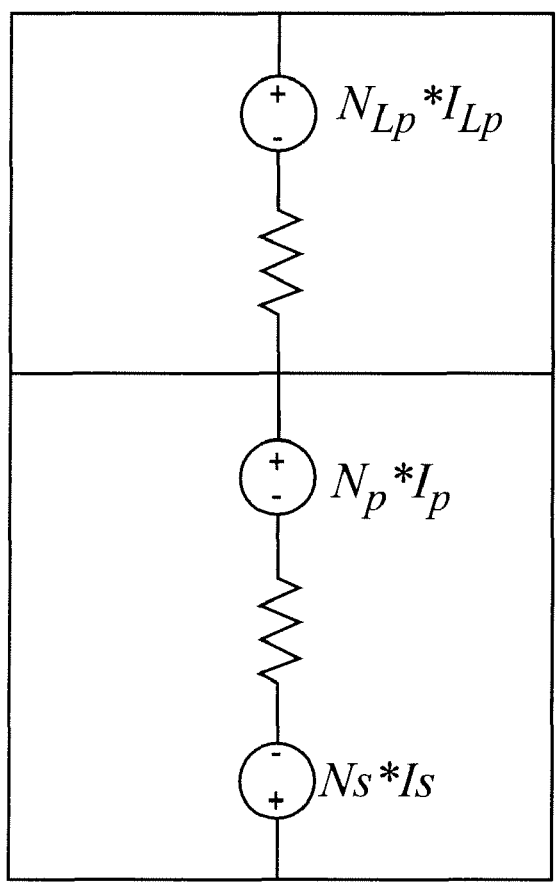

A second preferred configuration is shown in FIG. 17 with a schematic diagram of the magnetic circuit illustrated in FIG. 18. In this case, an additional E-shaped core is placed adjacent a three-leg, two aperture core of the EE or EI type with the $L_p$ winding preferably placed on the center leg thereof and which can thus achieve similar flux canceling effects as with the first configuration described above. A magnetic shunt may or may not be required to develop a desired value of $L_m$. Due to the separate core sections, the value of $L_p$ is particularly easy to control. Further, compared with the first configuration, the footprint is reduced although the profile will be slightly larger.

Figure 19:
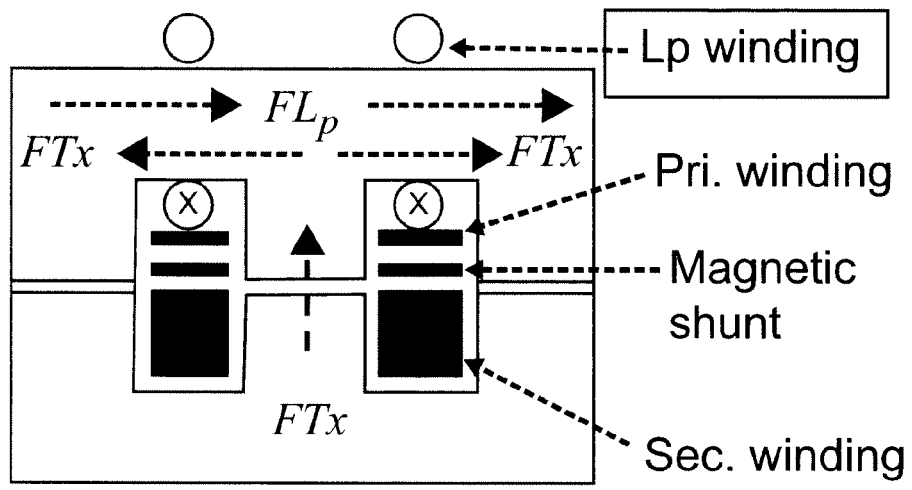
FIGS. 19 and 20 are a schematic representation and equivalent magnetic circuit of a firs embodiment on an integrated inductor/transformer for implementation of the invention.
Figure 20:
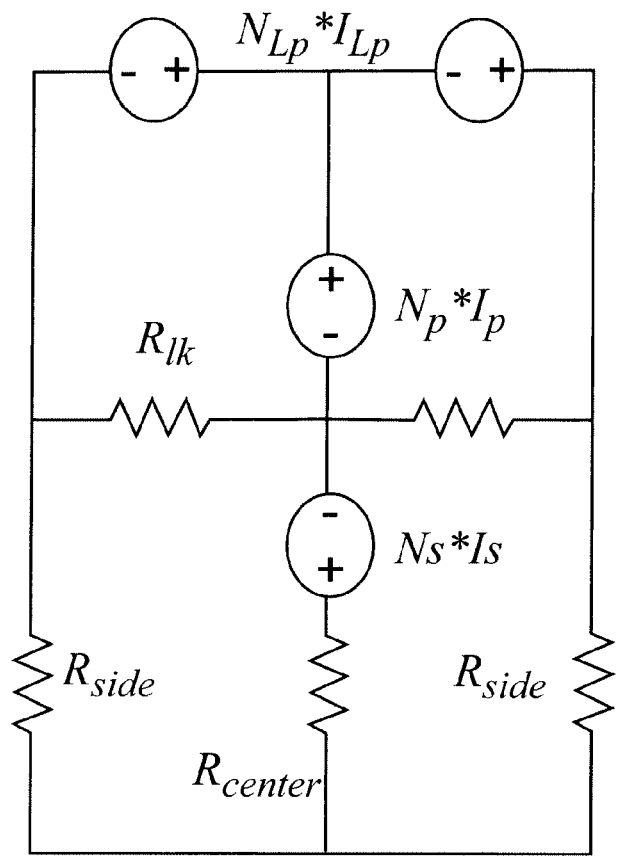

The third preferred configuration also utilizes three-leg, two aperture EE or EI cores as illustrated in FIG. 19 with the magnetic circuit schematically depicted in FIG. 20. However, in this configuration, the $L_p$ winding is divided and respective portions wound directly on an E-shaped core between respective pairs of legs thereof (or, perhaps more conveniently at separate locations on an I-shaped core element such that a central leg of the E-shaped core may be positioned between them) and such that the $L_p$ flux $FL_p$ will reinforce each other while canceling a portion of main transformer flux FTx in a symmetrical manner to eliminate effects of FTx on $L_p$ and vice-versa. Thus core loss may not be reduced and may slightly increase. However no additional core material is required to achieve integration. From an electrical performance point of view, the $L_p$ winding and the transformer are virtually decoupled. Thus the $L_p$ inductance (and other inductances for higher order tank circuits) can be created in an integrated fashion without affecting the other windings. Again, a magnetic shunt may or may not be required to develop a desired value of $L_m$.

Other configurations of an integrated magnetic structure for practice of the invention will become apparent to those skilled in the art in view of the exemplary configurations discussed above and are considered to be within the scope of the invention. However, the above configurations are considered to be particularly advantageous in providing compactness of volume, profile and footprint, minimization of required core material to reduce weight, and minimization of coupling between the transformer and $L_p$ windings while all may be simply and inexpensively constructed. In any case, two, three, four or more inductive elements including a transformer may be integrated into a single component in the above-described manner.

In view of the foregoing, it is clearly seen that a four-element resonant tank circuit power converter providing a band pass and a notch filter can provide all the advantages of an LLC converter and achieve highly effective current limiting for overload conditions in a very simple and inexpensive manner. The additional function of much increased efficiency and reduction of conduction losses and good power transfer to the load can be achieved at harmonics of the switching frequency consistent with improved over-current protection by provision of a single further resonant element in the tank circuit to achieve two resonant band pass filters and a notch filter. Setting the notch filter resonant frequency at an even multiple of the nominal switching frequency and setting the second band pass filter resonant frequency at an odd multiple of the nominal switching frequency assures minimal interaction between the filters while allowing the bandwidth of the switching drive circuitry (e.g. a voltage controlled oscillator) to be relatively narrow and much narrower than required to approach such effects in known soft-switching power converters. Either the four-element or five-element resonant power converter can also achieve/maintain ZVS and/or ZCS conditions to minimize electrical stress and switching losses consistent with the realization of all of the above effects.

While the invention has been described in terms of a single preferred embodiment, those skilled in the art will recognize that the invention can be practiced with modification within the spirit and scope of the appended claims.

We claim:

1. A multi-element DC/DC power converter comprising
   a switched power input circuit and
   a resonant tank circuit comprising at least four elements,
      said resonant tank circuit providing
      a band pass filter resonant at a first frequency, and
      a notch filter resonant at a second frequency higher than said first frequency.

2. A power converter as recited in claim 1 wherein said second frequency is an even multiple of said first frequency.

3. A power converter as recited in claim 1 wherein said second frequency is twice said first frequency.

4. A power converter as recited in claim 1 wherein said resonant tank circuit provides a further band pass filter.

5. A power converter as recited in claim 4 wherein said second frequency is an even multiple of said first frequency.

6. A power converter as recited in claim 5 wherein a resonant frequency of said further band pass filter is an odd multiple of said first frequency.

7. A power converter as recited in claim 6 wherein said second frequency is twice said first frequency.

8. A power converter as recited in claim 4 wherein a resonant frequency of said further band pass filter is an odd multiple of said first frequency.

9. A power converter as recited in claim 4 wherein a resonant frequency of said further band pass filter is three time said first frequency.

10. A power converter as recited in claim 1 wherein said switched power input is switched at a frequency controlled in response to an output voltage of said power converter.

11. A power converter as recited in claim 10 wherein a switching frequency of said switched power input is controlled by a voltage controlled oscillator.

12. A power converter as recited in claim 4 wherein said resonant tank circuit is of an LCLCL configuration.

13. A power converter as recited in claim 4 wherein at least two inductances of said resonant tank circuit are integrated into a single component.

14. A power converter as recited in claim 12 wherein three inductances of said resonant tank circuit are integrated into a single component.

15. A power converter as recited in claim 14, wherein said single component includes a three aperture magnetic core.

16. A power converter as recited in claim 14, wherein said single component include a two aperture core.

17. A power converter as recited in claim 16 wherein said single component further includes an additional E-shaped core part with a winding on a central leg thereof.

18. A multi-element DC/DC power converter comprising
a tank circuit providing a band pass filter and a notch filter,
a primary side input structure for supplying power to said tank circuit at a switching frequency controlled in accordance with an output voltage of said power converter, and
a secondary side output circuit for supplying power to a load from said tank circuit.

19. A power converter as recited in claim 18, wherein said primary side input circuit has a topology selected from the group consisting of a half-bridge topology, a full bridge topology, a three-level topology, and a stacked topology.

20. A power converter as recited in claim 18 wherein said secondary side output circuit has a topology selected from the group consisting of a center tapped topology, a full bridge topology and a voltage doubler topology.

* * * * *